(12) United States Patent
Kandanarachchi et al.

(10) Patent No.: US 11,845,880 B2
(45) Date of Patent: Dec. 19, 2023

(54) POLYCYCLIC-OLEFINIC COMPOSITIONS FOR LOW-LOSS FILMS HAVING IMPROVED THERMAL PROPERTIES

(71) Applicants: PROMERUS, LLC, Akron, OH (US); SUMITOMO BAKELITE CO., LTD., Tokyo (JP)

(72) Inventors: Pramod Kandanarachchi, Akron, OH (US); Larry F Rhodes, Akron, OH (US); Sho Kubota, Tokyo (JP)

(73) Assignee: PROMERUS, LLC, Akron, OH (US)

( * ) Notice: Subject to any disclaimer, the term of this patent is extended or adjusted under 35 U.S.C. 154(b) by 239 days.

(21) Appl. No.: 17/514,400

(22) Filed: Oct. 29, 2021

(65) Prior Publication Data

US 2022/0135831 A1    May 5, 2022

Related U.S. Application Data

(60) Provisional application No. 63/107,514, filed on Oct. 30, 2020.

(51) Int. Cl.
| | |
|---|---|
| *C09D 165/00* | (2006.01) |
| *C08F 212/06* | (2006.01) |
| *C09D 147/00* | (2006.01) |
| *C08G 61/08* | (2006.01) |
| *C09D 125/02* | (2006.01) |
| *C08F 36/20* | (2006.01) |

(52) U.S. Cl.
CPC ............ *C09D 165/00* (2013.01); *C08F 36/20* (2013.01); *C08F 212/06* (2013.01); *C08G 61/08* (2013.01); *C09D 125/02* (2013.01); *C09D 147/00* (2013.01)

(58) Field of Classification Search
USPC ....................................................... 526/281
See application file for complete search history.

(56) References Cited

FOREIGN PATENT DOCUMENTS

| JP | 2016/037577 A | 3/2016 |
|---|---|---|
| WO | WO 2000/20472 A1 | 4/2000 |
| WO | WO 2000/34344 A1 | 6/2000 |
| WO | WO 2017/165478 A1 | 9/2017 |
| WO | WO 2020/132665 A1 | 6/2020 |

OTHER PUBLICATIONS

Written Opinion of the ISA: PCT/US2021/057284, dated Feb. 24, 2022.

*Primary Examiner* — Fred M Teskin
(74) *Attorney, Agent, or Firm* — Balaram Gupta

(57) ABSTRACT

Embodiments in accordance with the present invention encompass compositions containing one or more polycycloolefinic monomers and at least one multifunctional olefinic monomer which when subjected to a suitable temperature undergoes mass polymerization to provide a three-dimensional insulating article which exhibits hitherto unattainable low dielectric constant and low-loss properties, and very high thermal properties. The compositions of this invention may additionally contain one or more organic or inorganic filler materials, which provide improved thermo-mechanical properties in addition to very low dielectric properties. The compositions are stable at room temperature and undergo mass polymerization only when subjected to suitable higher temperatures generally above 100° C. The compositions of this invention are useful in various applications, including as insulating materials in millimeter wave radar antennas, among others.

20 Claims, 1 Drawing Sheet

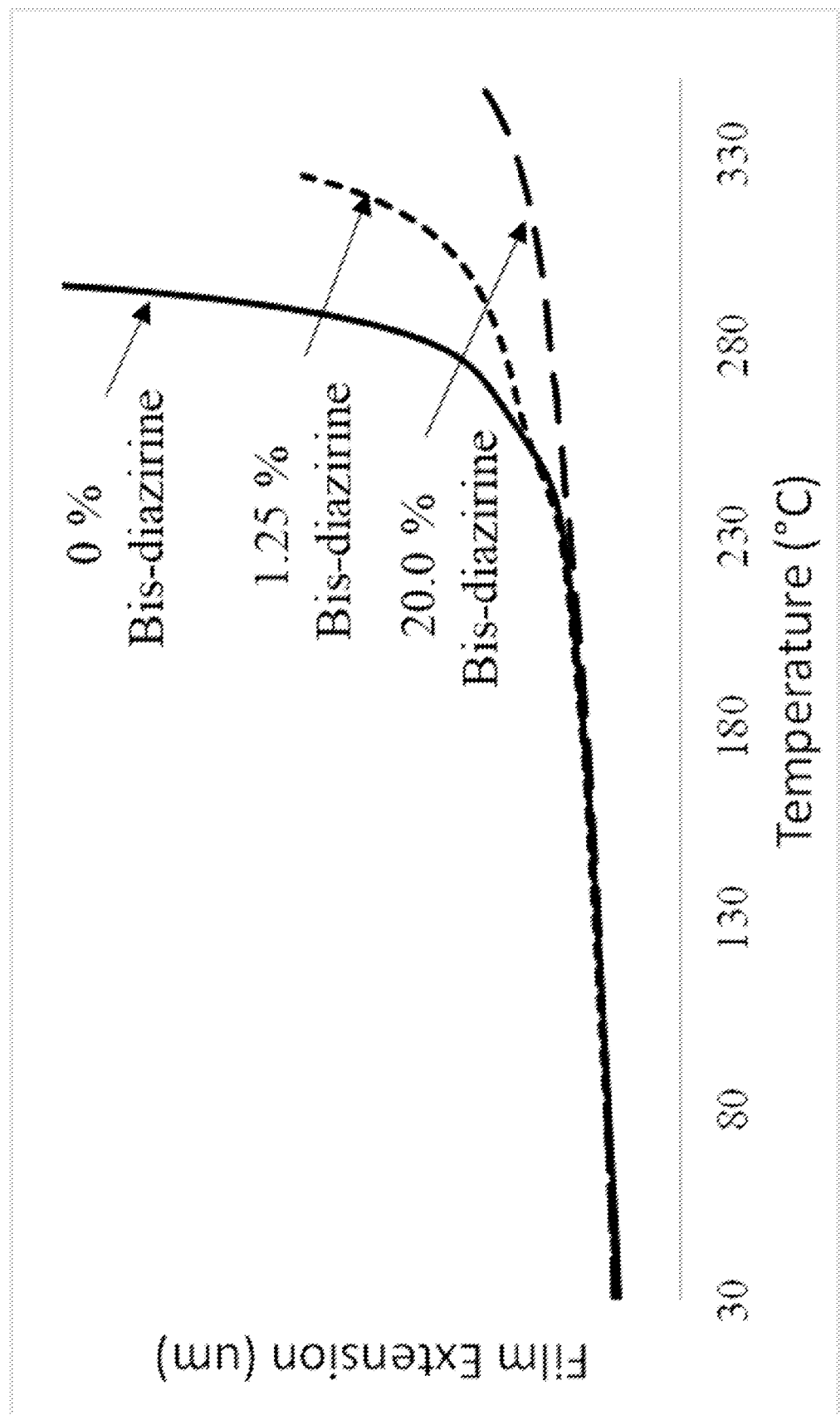

POLYCYCLIC-OLEFINIC COMPOSITIONS FOR LOW-LOSS FILMS HAVING IMPROVED THERMAL PROPERTIES

CROSS REFERENCE TO RELATED APPLICATIONS

This application claims the benefit of U.S. Provisional Application No. 63/107,514, filed Oct. 30, 2020, which is incorporated herein by reference in its entirety.

BACKGROUND OF THE INVENTION

Field of the Invention

Embodiments in accordance with the present invention relate generally to a composition containing one or more polycycloolefinic monomers and at least one multifunctional olefinic monomer which when subjected to a suitable temperature undergoes mass polymerization to provide a three-dimensional insulating article which exhibits hitherto unattainable low dielectric constant and low-loss properties, and very high thermal properties. More specifically, this invention relates to a composition containing a series of substituted norbornene derivatives and at least one bifunctional monomeric compound which undergoes mass polymerization in the presence of certain organopalladium compounds to form three-dimensional articles such as for example films, which exhibit very high glass transition temperature, which can be as high as 300° C. or higher, and exhibits low dielectric constant (less than 2.4 at a frequency of 10 GHz) and low-loss properties. Accordingly, the composition of this invention finds applications as insulating materials in a variety of applications including electromechanical devices having applications in the fabrication of a number of automotive parts, among others.

Description of the Art

It is well known in the art that insulating materials having low dielectric constant (Dk) and low-loss, also referred to as dielectric dissipation factor, (Df) are important in printed circuit boards catering to electrical appliances and automotive parts and other applications. Generally, in most of such devices the insulating materials that are suitable must have dielectric constant lower than 3 and low-loss lesser than 0.001 at high frequencies such as for example greater than 50 GHz. Also, there is an increased interest in developing organic dielectric materials as they are easy to fabricate among other advantages.

However, there are significant technical challenges in developing such insulating materials meeting all of the requirements. One such challenge is that such materials exhibit low coefficient of thermal expansion (CTE), which is preferably less than 50 ppm/K due to concerns of peeling from copper layers. Another challenge is that such materials exhibit very high glass transition temperature ($T_g$), which is preferably greater than 150° C. or even higher than 250° C. due to the process conditions used in the manufacture of printed circuit boards as well as harsh conditions the devices may encounter, such as for example millimeter-wave Radar antennas used in the automobiles.

Although films made from the addition polymerization of norbornene derivatives containing long side chains, such as for example, 5-hexylnorbornene (HexNB) and 5-decylnorbornene (DecNB) are known to have low Dk and Df due to their hydrophobic nature these films exhibit high CTE (>200 ppm/K) and low $T_g$. See, for example, JP 2016037577A and JP 2012121956A.

It has also been reported in the literature that certain of the polymers, such as for example, fluorinated poly-ethylene, poly-ethylene and poly-styrene feature low Dk/Df but all of such polymers are unsuitable as organic insulating materials as they exhibit very low glass transition temperatures, which can be much lower than 150° C. Further, it has also been reported in the literature that generally low CTE and high $T_g$ polymers can be generated when certain substituted norbornenes substituted with polar groups such a ester or alcohol groups are incorporated.

However incorporation of such groups will increase both Dk and Df due to their polarizability under an electromagnetic field, particularly at high frequencies. Therefore, such polar group substituted norbornenes are unsuitable in forming insulating materials as contemplated herein.

Therefore, there is still a need to develop new insulating materials that exhibit not only low dielectric properties but also very high thermal properties.

In addition, there is also a need to develop materials, which can form thermoset films rather than thermoplastic films. That is, the thermosets are generally cross-linked structures, which are more stable to higher temperatures and do not exhibit any thermal mobility unlike thermoplastics.

Accordingly, it is an object of this invention to provide a composition containing one or more monomers of substituted norbornenes and a multifunctional monomer, which when mass polymerized provides an insulating material having hitherto unattainable properties.

Other objects and further scope of the applicability of the present invention will become apparent from the detailed description that follows.

SUMMARY OF THE INVENTION

Surprisingly, it has now been found that employing a composition containing one or more monomers of formula (I) as described herein and at least one multi-functional compound of formulae (A1) or (A2) or (A3) as described herein, it is now possible to form a three-dimensional object which provides hitherto unattainable dielectric as well as thermal properties.

In another aspect of this invention there is also a provided a kit comprising the composition of this invention.

BRIEF DESCRIPTION OF THE DRAWINGS

Embodiments in accordance with the present invention are described below with reference to the following accompanying FIGURES and/or images. Where drawings are provided, it will be drawings which are simplified portions of various embodiments of this invention and are provided for illustrative purposes only.

The drawing shows a comparative thermograms obtained from the thermo-mechanical analysis (TMA) of a few of the films formed from the compositions of this invention containing different levels of the bi-functional crosslinker as described herein.

DETAILED DESCRIPTION OF THE INVENTION

The terms as used herein have the following meanings:

As used herein, the articles "a," "an," and "the" include plural referents unless otherwise expressly and unequivocally limited to one referent.

Since all numbers, values and/or expressions referring to quantities of ingredients, reaction conditions, etc., used herein and in the claims appended hereto, are subject to the various uncertainties of measurement encountered in obtaining such values, unless otherwise indicated, all are to be understood as modified in all instances by the term "about."

Where a numerical range is disclosed herein such range is continuous, inclusive of both the minimum and maximum values of the range as well as every value between such minimum and maximum values. Still further, where a range refers to integers, every integer between the minimum and maximum values of such range is included. In addition, where multiple ranges are provided to describe a feature or characteristic, such ranges can be combined. That is to say that, unless otherwise indicated, all ranges disclosed herein are to be understood to encompass any and all sub-ranges subsumed therein. For example, a stated range of from "1 to 10" should be considered to include any and all sub-ranges between the minimum value of 1 and the maximum value of 10. Exemplary sub-ranges of the range 1 to 10 include, but are not limited to, 1 to 6.1, 3.5 to 7.8, and 5.5 to 10, etc.

As used herein, "hydrocarbyl" refers to a group that contains carbon and hydrogen atoms, non-limiting examples being alkyl, cycloalkyl, aryl, aralkyl, alkaryl, and alkenyl. The term "halohydrocarbyl" refers to a hydrocarbyl group where at least one hydrogen has been replaced by a halogen. The term perhalocarbyl refers to a hydrocarbyl group where all hydrogens have been replaced by a halogen.

As used herein, the expression "alkyl" means a saturated, straight-chain or branched-chain hydrocarbon substituent having the specified number of carbon atoms. Particular alkyl groups are methyl, ethyl, n-propyl, isopropyl, tert-butyl, and so on. Derived expressions such as "alkoxy", "thioalkyl", "alkoxyalkyl", "hydroxyalkyl", "alkylcarbonyl", "alkoxycarbonylalkyl", "alkoxycarbonyl", "diphenylalkyl", "phenylalkyl", "phenylcarboxyalkyl" and "phenoxyalkyl" are to be construed accordingly.

As used herein, the expression "cycloalkyl" includes all of the known cyclic groups. Representative examples of "cycloalkyl" includes without any limitation cyclopropyl, cyclobutyl, cyclopentyl, cyclohexyl, cycloheptyl, cyclooctyl, and the like. Derived expressions such as "cycloalkoxy", "cycloalkylalkyl", "cycloalkylaryl", "cycloalkylcarbonyl" are to be construed accordingly.

As used herein, the expression "perhaloalkyl" represents the alkyl, as defined above, wherein all of the hydrogen atoms in said alkyl group are replaced with halogen atoms selected from fluorine, chlorine, bromine or iodine. Illustrative examples include trifluoromethyl, trichloromethyl, tribromomethyl, triiodomethyl, pentafluoroethyl, pentachloroethyl, pentabromoethyl, pentaiodoethyl, and straight-chained or branched heptafluoropropyl, heptachloropropyl, heptabromopropyl, nonafluorobutyl, nonachlorobutyl, undecafluoropentyl, undecachloropentyl, tridecafluorohexyl, tridecachlorohexyl, and the like. Derived expression, "perhaloalkoxy", is to be construed accordingly. It should further be noted that certain of the alkyl groups as described herein may partially be fluorinated, that is, only portions of the hydrogen atoms in said alkyl group are replaced with fluorine atoms and shall be construed accordingly.

As used herein the expression "acyl" shall have the same meaning as "alkanoyl", which can also be represented structurally as "R—CO—," where R is an "alkyl" as defined herein having the specified number of carbon atoms. Additionally, "alkylcarbonyl" shall mean same as "acyl" as defined herein. Specifically, "($C_1$-$C_4$)acyl" shall mean formyl, acetyl or ethanoyl, propanoyl, n-butanoyl, etc. Derived expressions such as "acyloxy" and "acyloxyalkyl" are to be construed accordingly.

As used herein, the expression "aryl" means substituted or unsubstituted phenyl or naphthyl. Specific examples of substituted phenyl or naphthyl include o-, p-, m-tolyl, 1,2-, 1,3-, 1,4-xylyl, 1-methylnaphthyl, 2-methylnaphthyl, etc. "Substituted phenyl" or "substituted naphthyl" also include any of the possible substituents as further defined herein or one known in the art.

As used herein, the expression "arylalkyl" means that the aryl as defined herein is further attached to alkyl as defined herein. Representative examples include benzyl, phenylethyl, 2-phenylpropyl, 1-naphthylmethyl, 2-naphthylmethyl and the like.

As used herein, the expression "alkenyl" means a non-cyclic, straight or branched hydrocarbon chain having the specified number of carbon atoms and containing at least one carbon-carbon double bond, and includes ethenyl and straight-chained or branched propenyl, butenyl, pentenyl, hexenyl, and the like. Derived expression, "arylalkenyl" and five membered or six membered "heteroarylalkenyl" is to be construed accordingly. Illustrative examples of such derived expressions include furan-2-ethenyl, phenylethenyl, 4-methoxyphenylethenyl, and the like.

As used herein, the expression "heteroaryl" includes all of the known heteroatom containing aromatic radicals. Representative 5-membered heteroaryl radicals include furanyl, thienyl or thiophenyl, pyrrolyl, isopyrrolyl, pyrazolyl, imidazolyl, oxazolyl, thiazolyl, isothiazolyl, and the like. Representative 6-membered heteroaryl radicals include pyridinyl, pyridazinyl, pyrimidinyl, pyrazinyl, triazinyl, and the like radicals. Representative examples of bicyclic heteroaryl radicals include, benzofuranyl, benzothiophenyl, indolyl, quinolinyl, isoquinolinyl, cinnolyl, benzimidazolyl, indazolyl, pyridofuranyl, pyridothienyl, and the like radicals.

As used herein, the expression "heterocycle" includes all of the known reduced heteroatom containing cyclic radicals. Representative 5-membered heterocycle radicals include tetrahydrofuranyl, tetrahydrothiophenyl, pyrrolidinyl, 2-thiazolinyl, tetrahydrothiazolyl, tetrahydrooxazolyl, and the like. Representative 6-membered heterocycle radicals include piperidinyl, piperazinyl, morpholinyl, thiomorpholinyl, and the like. Various other heterocycle radicals include, without limitation, aziridinyl, azepanyl, diazepanyl, diazabicyclo[2.2.1]hept-2-yl, and triazocanyl, and the like.

"Halogen" or "halo" means chloro, fluoro, bromo, and iodo.

In a broad sense, the term "substituted" is contemplated to include all permissible substituents of organic compounds. In a few of the specific embodiments as disclosed herein, the term "substituted" means substituted with one or more substituents independently selected from the group consisting of ($C_1$-$C_6$)alkyl, ($C_2$-$C_6$)alkenyl, ($C_1$-$C_6$)perfluoroalkyl, phenyl, hydroxy, —$CO_2H$, an ester, an amide, ($C_1$-$C_6$) alkoxy, ($C_1$-$C_6$)thioalkyl and ($C_1$-$C_6$)perfluoroalkoxy. However, any of the other suitable substituents known to one skilled in the art can also be used in these embodiments.

It should be noted that any atom with unsatisfied valences in the text, schemes, examples and tables herein is assumed to have the appropriate number of hydrogen atom(s) to satisfy such valences.

It will be understood that the terms "dielectric" and "insulating" are used interchangeably herein. Thus reference to an insulating material or layer is inclusive of a dielectric material or layer and vice versa. Further, as used herein, the term "organic electronic device" will be understood to be inclusive of the term "organic semiconductor device" and the several specific implementations of such devices used, for example, in automotive industry.

As used herein, the dielectric constant (Dk) of a material is the ratio of the charge stored in an insulating material placed between two metallic plates to the charge that can be stored when the insulating material is replaced by vacuum or air. It is also called as electric permittivity or simply permittivity. And, at times referred as relative permittivity, because it is measured relatively from the permittivity of free space.

As used herein, "low-loss" is the dissipation factor (Df), which is a measure of loss-rate of energy of a mode of oscillation (mechanical, electrical, or electromechanical) in a dissipative system. It is the reciprocal of quality factor, which represents the "quality" or durability of oscillation.

By the term "derived" is meant that the polymeric repeating units are polymerized (formed) from, for example, polycyclic norbornene-type monomers in accordance with formulae (I) wherein the resulting polymers are formed by 2,3 enchainment of norbornene-type monomers as shown below:

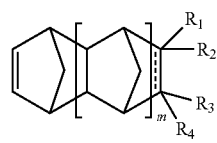

The above polymerization is also known widely as vinyl addition polymerization typically carried out in the presence of organometallic compounds such as organopalladium compounds or organonickel compounds as further described in detail below.

Thus, in accordance with the practice of this invention there is provided a film forming composition comprising:
a) one or more olefinic monomers of the formula (I):

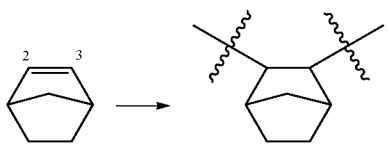

(I)

wherein:
m is 0 or 1;
------ is a single bond or a double bond;
$R_1$, $R_2$, $R_3$ and $R_4$ are the same or different and each independently selected from the group consisting of hydrogen, linear or branched $(C_4$-$C_{16})$alkyl, linear or branched $(C_2$-$C_{16})$alkenyl, $(C_3$-$C_{10})$cycloalkyl, $(C_3$-$C_{10})$cycloalkenyl, $(C_6$-$C_{12})$bicycloalkyl, $(C_6$-$C_{12})$aryl and $(C_6$-$C_{12})$aryl$(C_1$-$C_6)$alkyl; or one of $R_1$ and $R_2$ taken together with one of $R_3$ and R4 and the carbon atoms to which they are attached to form a substituted or unsubstituted $(C_5$-$C_{14})$cyclic, $(C_5$-$C_{14})$bicyclic or $(C_5$-$C_{14})$tricyclic ring optionally containing one or more double bonds;

b) at least one compound selected from the group consisting of:
a compound of formula (A1):

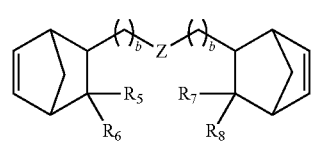

(A1)

wherein:
b is an integer from 2 to 6;
Z is a bond or $R_9R_{10}SiOSiR_{11}R_{12}$, where each of $R_9$, $R_{10}$, $R_{11}$ and $R_{12}$ are the same or different and each independently of one another selected from the group consisting of methyl, ethyl and linear or branched $(C_3$-$C_6)$alkyl;
$R_5$, $R_6$, $R_7$ and $R_8$ are the same or different and each independently of one another selected from the group consisting of hydrogen, methyl, ethyl and linear or branched $(C_3$-$C_{16})$alkyl;
a compound of formula (A2):

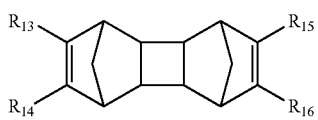

(A2)

wherein
$R_{13}$, $R_{14}$, $R_{15}$ and $R_{16}$ are the same or different and each independently of one another selected from the group consisting of hydrogen, methyl, ethyl and linear or branched $(C_3$-$C_{16})$alkyl; and
a compound of formula (A3):

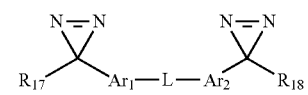

(A3)

Wherein
L is a bond or a divalent linking or a spacer group selected from:
methylene, ethylene, linear or branched $(C_3$-$C_{16})$alkylene, $(C_3$-$C_{16})$cycloalkylene, $(C_5$-$C_8)$heterocycle, $(C_6$-$C_{12})$arylene, $(C_5$-$C_{12})$heteroarylene and —$(CH_2)_cO(CH_2)_c$—, where c is an integer from 1 to 6 and optionally each of $CH_2$ may be substituted with methyl, ethyl, linear or branched $(C_3$-$C_{16})$alkyl, and $(C_6$-$C_{12})$aryl, and wherein optionally portions of hydrogen on methylene, ethylene or $(C_3$-$C_{16})$ alkylene are replaced with a group selected from the group consisting of fluorine, trifluoromethyl, pentafluoroethyl and linear or branched perfluoro$(C_3$-$C_{16})$alkyl;
$R_{17}$ and $R_{18}$ are the same or different and each is independently selected from methyl, ethyl, linear or branched $(C_3$-$C_{12})$alkyl, $(C_6$-$C_{12})$aryl and $(C_6$-$C_{12})$aryl$(C_1$-$C_{12})$alkyl, where optionally portions of hydrogen on methyl, ethyl or ($C_3$-$C_{12}$)alkyl are replaced with a group selected from the group consisting of fluorine, trifluoromethyl, pentafluoroethyl and linear or branched ($C_3$-$C_{12}$)perfluoroalkyl;

$Ar_1$ and $Ar_2$ are the same or different and each is independently selected from ($C_6$-$C_{12}$)arylene or ($C_6$-$C_{12}$)heteroarylene group optionally substituted with a group selected from ($C_1$-$C_4$)alkyl, ($C_1$-$C_4$)alkoxy, ($C_6$-$C_{10}$)aryl, ($C_6$-$C_{12}$)aryloxy, ($C_6$-$C_{12}$)aryl($C_1$-$C_4$)alkyl and ($C_6$-$C_{12}$)aryl($C_1$-$C_4$)alkyloxy;

c) an organopalladium compound selected from the group consisting of:
palladium (II) bis(triphenylphosphine) dichloride;
palladium (II) bis(triphenylphosphine) dibromide;
palladium (II) bis(triphenylphosphine) diacetate;
palladium (II) bis(triphenylphosphine) bis(trifluoroacetate);
palladium (II) bis(tricyclohexylphosphine) dichloride;
palladium (II) bis(tricyclohexylphosphine) dibromide;
palladium (II) bis(tricyclohexylphosphine) diacetate (Pd785);
palladium (II) bis(tricyclohexylphosphine) bis(trifluoroacetate);
palladium (II) bis(tri-p-tolylphosphine) dichloride;
palladium (II) bis(tri-p-tolylphosphine) dibromide;
palladium (II) bis(tri-p-tolylphosphine) diacetate;
palladium (II) bis(tri-p-tolylphosphine) bis(trifluoroacetate);
palladium (II) ethyl hexanoate;
bis(acetonato)palladium (II);
dichloro bis(benzonitrile)palladium (II);
platinum (II) chloride;
platinum (II) bromide; and
platinum bis(triphenylphosphine)dichloride; and d) an activator selected from the group consisting of:
lithium tetrafluoroborate;
lithium triflate;
lithium tetrakis(pentafluorophenyl)borate;
lithium tetrakis(pentafluorophenyl)borate etherate (LiFABA);
sodium tetrakis(pentafluorophenyl)borate etherate (NaFABA);
trityl tetrakis(pentafluorophenyl)borate etherate (tritylFABA);
tropylium tetrakis(pentafluorophenyl)borate etherate (tropyliumFABA);
lithium tetrakis(pentafluorophenyl)borate isopropanolate;
lithium tetraphenylborate;
lithium tetrakis(3,5-bis(trifluoromethyl)phenyl)borate;
lithium tetrakis(2-fluorophenyl)borate;
lithium tetrakis(3-fluorophenyl)borate;
lithium tetrakis(4-fluorophenyl)borate;
lithium tetrakis(3,5-difluorophenyl)borate;
lithium hexafluorophosphate;
lithium hexaphenylphosphate;
lithium hexakis(pentafluorophenyl)phosphate;
lithium hexafluoroarsenate;
lithium hexaphenylarsenate;
lithium hexakis(pentafluorophenyl)arsenate;
lithium hexakis(3,5-bis(trifluoromethyl)phenyl)arsenate;
lithium hexafluoroantimonate;
lithium hexaphenylantimonate;
lithium hexakis(pentafluorophenyl)antimonate;
lithium hexakis(3,5-bis(trifluoromethyl)phenyl)antimonate;
lithium tetrakis(pentafluorophenyl)aluminate;
lithium tris(nonafluorobiphenyl)fluoroaluminate;
lithium (octyloxy)tris(pentafluorophenyl)aluminate;
lithium tetrakis(3,5-bis(trifluoromethyl)phenyl)aluminate;
lithium methyltris(pentafluorophenyl)aluminate;
dimethylanilinium tetrakis(pentafluorophenyl)borate (DANFABA); and wherein the film formed from the composition has a dielectric constant (Dk) less than 2.4 at a frequency of 10 GHz, a glass transition temperature greater than 150° C. and a coefficient of thermal expansion (CTE) less than 150 ppm/K.

It should be noted that the composition of this invention is a mass polymerizable composition when subjected to suitable temperature conditions and/or photolytic conditions. That is, generally, when a composition of this invention containing one or more monomers of formula (I), at least one compound of formula (A1) or (A2) or (A3), at least one organopalladium compound and an activator as listed herein are heated to certain temperature the composition undergoes mass polymerization to form a solid object. Any of the temperature conditions that will bring about such a mass polymerization can be used herein. In some embodiments, the composition of this invention is heated to a temperature of about 60° C. to about 150° C. for a sufficient length of time, for example from about one hour to eight hours. In some other embodiments, the composition of this invention is heated to a temperature of about 90° C. to about 130° C. for a sufficient length of time, for example from about one hour to four hours.

Advantageously, it has now further been found that the composition of this invention can also be mass polymerized to form solid objects by exposing to a suitable electromagnetic radiation.

In some embodiments the compounds of formulae (A1) or (A2) or (A3) can be activated at certain wavelength of the electromagnetic radiation which can generally range from about 240 nm to 400 nm. Accordingly, any of the compounds of formulae (A1) or (A2) or (A3) which are active in this electromagnetic radiation can be employed in the compositions of this invention which are suitable for such photolytic mass polymerization conditions. In some embodiments the wavelength of the radiation to activate the compounds of formulae (A1) or (A2) or (A3) is 260 nm. In some other embodiments the wavelength of the radiation to activate the compounds of formulae (A1) or (A2) or (A3) is 310 nm. In yet some other embodiments the wavelength of the radiation to activate the compounds of formulae (A1) or (A2) or (A3) is 365 nm or 395 nm, and so on.

In some embodiments of this invention the composition of this invention may additionally contain other photosensitizer compounds which can activate the compounds of formulae (A1) or (A2) or (A3) in order to facilitate the mass polymerization of the monomers of formula (I). For this purpose, any suitable sensitizer compound can be employed in the compositions of the present invention. Such suitable sensitizer compounds include, photosensitizers, such as, anthracenes, phenanthrenes, chrysenes, benzpyrenes, fluoranthenes, rubrenes, pyrenes, xanthones, indanthrenes, and mixtures thereof. In some exemplary embodiments, suitable sensitizer components include mixtures thereof. Generally, the photosensitizers absorb energy from the radiated light source and transfer that energy to the desirable substrate/reactant employed in the composition of this invention.

In most cases the organopalladium compound and the activator employed to affect the mass polymerization maybe soluble in the monomers employed so as to form a homogeneous solution. If not, the organopalladium compound and the activator can be dissolved in a suitable solvent, such as for example, tetrahydrofuran (THF) and then mixed with one or more monomers of formula (I) and a compound of formula (A1) or (A2) or (A3) to form a homogeneous solution. Other solvents that can be used to solubilize the organopalladium compound and/or the activator as described herein include ethyl acetate (EA), toluene, trifluorotoluene (TFT), cyclohexane (CH), methylcyclohexane (MCH), and the like. Such mass polymerization methods are very well known and any of the known procedures known in the art can be employed herein to form the films of this invention. See for instance, U.S. Pat. No. 6,825,307, pertinent portions of which are incorporated herein by reference.

In some embodiments, the film forming composition contains a monomer of formula (I), wherein
m is 0;
----- is a single bond;
$R_1$, $R_2$, $R_3$ and $R_4$ are the same or different and each independently selected from the group consisting of hydrogen, n-butyl, n-hexyl, cyclohexyl, cyclohexenyl and norbornyl.

Again, any of the monomers of formula (I) can be used to form the film forming composition of this invention. Non-limiting examples of such a monomer of formula (I) is selected from the group consisting of:

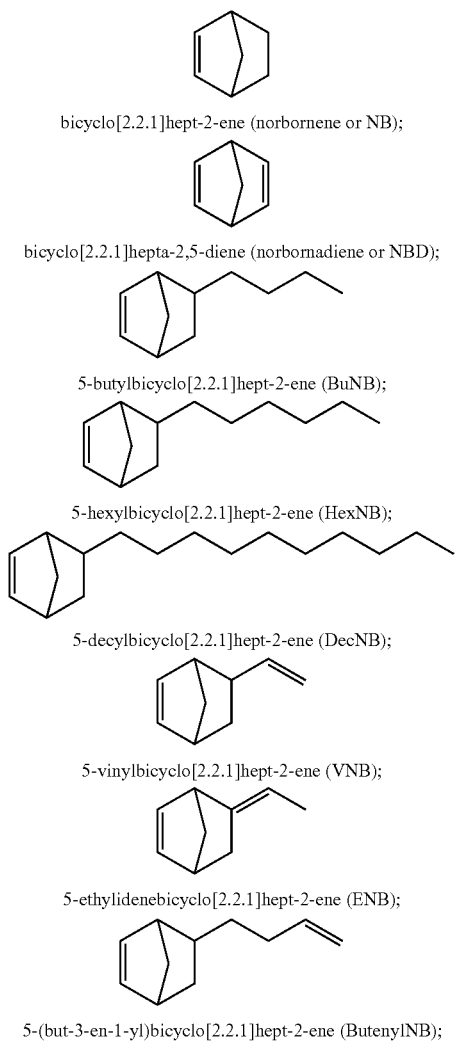

bicyclo[2.2.1]hept-2-ene (norbornene or NB);

bicyclo[2.2.1]hepta-2,5-diene (norbornadiene or NBD);

5-butylbicyclo[2.2.1]hept-2-ene (BuNB);

5-hexylbicyclo[2.2.1]hept-2-ene (HexNB);

5-decylbicyclo[2.2.1]hept-2-ene (DecNB);

5-vinylbicyclo[2.2.1]hept-2-ene (VNB);

5-ethylidenebicyclo[2.2.1]hept-2-ene (ENB);

5-(but-3-en-1-yl)bicyclo[2.2.1]hept-2-ene (ButenylNB);

-continued

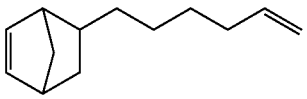

5-(hex-5-en-1-yl)bicyclo[2.2.1]hept-2-ene (HexenylNB);

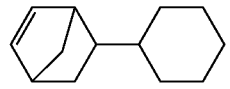

5-cyclohexylbicyclo[2.2.1]hept-2-ene (CyHexNB);

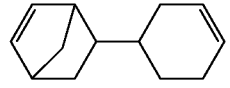

5-(cyclohex-3-en-1-yl)bicyclo[2.2.1]hept-2-ene (CyclohexeneNB);

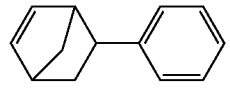

5-phenylbicyclo[2.2.1]hept-2-ene (PhNB);

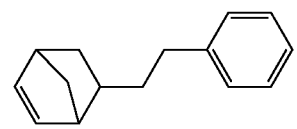

5-phenethylbicyclo[2.2.1]hept-2-ene (PENB);

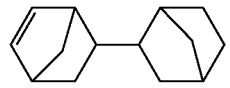

2,2'-bi(bicyclo[2.2.1]heptan-5-ene) (NBANB);

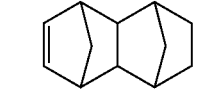

1,2,3,4,4a,5,8,8a-octahydro-1,4:5,8-dimethanonaphthalene (TD);

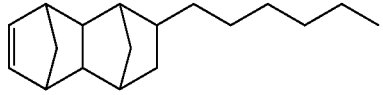

2-hexyl-1,2,3,4,4a,5,8,8a-octahydro-1,4:5,8-dimethanonaphthalene (HexTD);

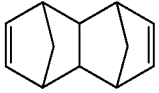

1,4,4a,5,8,8a-hexahydro-1,4:5,8-dimethanonaphthalene (TDD);

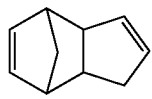

3a,4,7,7a-tetrahydro-1H-4,7-methanoindene (DCPD); and

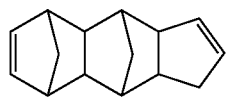

3a,4,4a,5,8,8a,9,9a-octahydro-1H-4,9:5,8-dimethanocyclopenta[b]naphthalene (CPD3).

Similarly, any of the specific examples within the scope of formulae (A1) can be employed in the film forming composition of this invention which will bring about the intended benefit. Non-limiting examples of such a compound of formula (A1) is selected from the group consisting of:

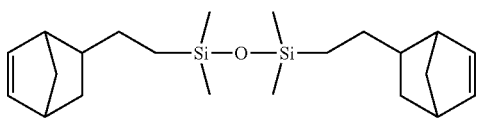 [SMILES: C[Si](C)(CCC1CC2C=CC1C2)O[Si](C)(C)CCC1CC2C=CC1C2]

1,3-bis(2-(bicyclo[2.2.1]hept-5-en-2-yl)ethyl)-1,1,3,3-tetramethyldisiloxane (NBC2DMSC2NB); and

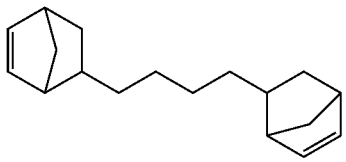 [SMILES: C1=CC2CC1CC2CCCCC1CC2C=CC1C2]

1,4-di(bicyclo[2.2.1]hept-5-en-2-yl)butane (NBC4NB).

Any of the specific examples within the scope of formulae (A2) can be employed in the film forming composition of this invention which will bring about the intended benefit. Non-limiting examples of such a compound of formula (A2) is:

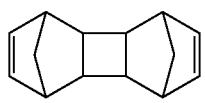

1,4,4a,4b,5,8,8a,8b-octahydro-1,4:5,8-dimethanobiphenylene ((NBD)2).

Finally, any of the specific examples within the scope of formulae (A3) can be employed in the film forming composition of this invention which will bring about the intended benefit. Non-limiting examples of such a compound of formula (A3) is:

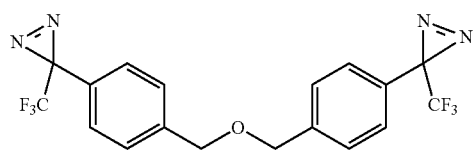

3,3′-((oxybis(methylene))bis(4,1-phenylene))bis(3-(trifluoromethyl)-3H-diazirine);

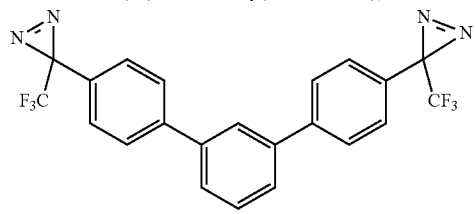

4,4″-bis(3-(trifluoromethyl)-3H-diazirin-3-yl)-1,1′:3′,1″-terphenyl;

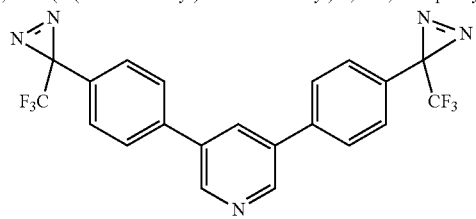

3,5-bis(4-(3-trifluoromethyl)-3H-diazirin-3-yl)phenyl)pyridine;

-continued

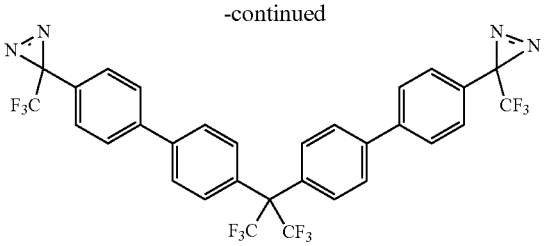

3,3′-((perfluoropropane-2,2-diyl)bis([1,1′-biphenyl]-4′,4-diyl))bis(3-(trifluoromethyl)-3H-diazirine); and

3,3′-((perfluoropropane-2,2-diyl)bis(4,1-phenylene))bis(3-(trifluoromethyl)-3H-diazirine), commercially available as GEN-I BondLynx from XLynX Materials, Inc.

As noted, the film forming composition according to this invention contains at least one monomer of formula (I) and one compound of formula (A1) or (A2) or (A3). Any of the amounts of a monomer of formula (I) with a compound of formula (A1) or (A2) or (A3) can be employed to form the composition of this invention that would bring about the intended benefit, including either the low dielectric properties as described herein and/or thermal/mechanical properties or both or any other desirable property depending upon the intended final application. Accordingly, the molar ratio of a monomer of formula (I) to a compound of formula (A1) or (A2) or (A3) can be from 95:5 to 5:95. In some embodiments, the molar ratio of a monomer of formula (I): a compound of formula (A1) or (A2) or (A3) is in the range from 90:10 to 10:90; in some other embodiments it is from 85:15 to 15:85; it is from 80:20 to 20:80; it is from 70:30 to 30:70; it is from 75:25 to 25:75; it is from 60:40 to 40:60; and it is 50:50, and so on.

In some embodiments the amount of the compound of formula (A1) or (A2) or (A3) used may be less than five mole percent. Accordingly, in some embodiments the molar ratio of a monomer of formula (I) to a compound of formula (A1) or (A2) or (A3) can be from 99:1 to 1:99, 98:2 to 2:98, 97:3 to 3:97, 96:4 to 4:96, and fractions thereof. All of such combinations which provides desired benefit in the intended applications can be used to form the compositions of this invention.

It should further be noted that more than one monomer of formula (I) and more than one compound of formulae (A1) or (A2) or (A3) can also be used in the composition of this invention. Accordingly, the molar ratio of first monomer of formula (I) to second monomer of formula (I) can be from 1:99 to 99:1. In some embodiments, the molar ratio of first monomer of formula (I):second monomer of formula (I) is in the range from 5:95 to 95:5; in some other embodiments it is from 10:90 to 90:10; it is from 15:85 to 85:15; it is from 20:80 to 80:20; it is from 30:70 to 70:30; it is from 60:40 to 40:60; and it is 50:50, and so on. Similarly, any desirable amounts of more than one compound of formulae (A1) or (A2) or (A3) can be used including various ratios as used herein when more than one monomer of formula (I) is used in the composition of this invention.

In general, the composition in accordance with the present invention encompass the above described one or more of monomer of formula (I), as it will be seen below, various composition embodiments are selected to provide properties to such embodiments that are appropriate and desirable for the use for which such embodiments are directed, thus such embodiments are tailorable to a variety of specific applications. Accordingly, in some embodiments the composition of this invention contains more than two distinct monomers of formula (I), such as for example three different monomers of formula (I) or four different monomers of formula (I) along with any desirable number of compounds of formulae (A1) or (A2) or (A3).

For example, as already discussed above, by employing proper combination of different monomers of formula (I) it is now possible to tailor a composition having the desirable low dielectric properties and thermo-mechanical properties, among other properties. In addition, it may be desirable to include other polymeric or monomeric materials which are compatible to provide desirable low-loss and low dielectric properties depending upon the end use application as further discussed in detail below.

Even more advantageously it has now been found that employing one or more of compounds of formula (A1) or (A2) or (A3) it is now possible to form crosslink structures within the polymeric framework. That is, crosslinks can occur intra-molecular (i.e., between two cross-linkable sites on the same polymer chain). Statistically, this can happen and all such combinations are part of this invention. By forming such inter-molecular or intramolecular crosslinks the polymers formed from the composition of this invention provide hitherto unobtainable properties. This may include for example improved thermal properties. That is, much higher glass transition temperatures than observed for non-crosslinked polymers of similar composition. In addition, such crosslinked polymers are more stable at higher temperatures, which can be higher than 350° C. High temperature stability can also be measured by well known thermogravimetric analysis (TGA) methods known in the art. One such measurement includes a temperature at which the polymer loses five percent of its weight ($T_{d5}$). As will be seen below by specific examples that follow the $T_{d5}$ of the polymers formed from the composition of this invention can generally be in the range from about 270° C. to about 320° C. or higher. In some embodiments, the $T_{d5}$ of the polymers formed from the composition of this invention is in the range from about 280° C. to about 300° C.

It should further be noted that in order to achieve the crosslinking of the polymers formed from the composition it is not always necessary to use one or more compounds of formulae (A1) or (A2) or (A3). That is, when a monomer of formula (I) contains one or more distinct monomer containing an unsaturated double bond that itself may serve as crosslinkable monomer with another polymeric chain either intermolecularly or intramolecularly as described above. Accordingly, in some embodiments there is provided a composition containing at least two monomers of formula (I) wherein at least one monomer contains a double bond. Any of such combinations are also part of this invention.

In addition, it should be noted that the crosslinked polymers formed from the composition of this invention may form thermosets thus offering additional advantages especially in certain applications where thermoplastics are not desirable. For example, any of the applications where higher temperatures are involved the thermoplastic polymers become less desirable as such polymeric materials may flow and are not suitable for such high temperature applications. Such applications include millimeter wave radar antennas as contemplated herein, among other applications.

It should further be noted that the polymers formed from one or more monomers of formula (I) can also be reacted with one or more compounds of formulae (A1) or (A2) or (A3) to form the aforementioned cross-linked thermoset forms. Accordingly, in some embodiments, there is further provided a composition, which contains a polymer formed from one or more monomers of formula (I) and at least one compound of formulae (A1) or (A2) or (A3) in a suitable solvent. The solution thus formed can be cast into a film by any of the known methods and subjected either to suitable higher temperature as described herein or exposed to suitable radiation to form a crosslinked film. Such suitable solvents include any of the solvents that will dissolve the polymers formed from the monomers of formula (I), for example, hydrocarbon solvents, such as decane, halohydrocarbon solvents such as dichloromethane or dichloroethane, or ester solvents such as ethyl acetate, ether solvents such as tetrahydrofuran or diethyl ether, diglyme, or alcohol solvents, such as ethyl alcohol, and the like. Suitable temperatures to carry out the crosslinking can be from about 100° C. to about 180° C. or higher for a sufficient length of time, for example, 30 minutes to one hour or longer. Suitable actinic radiation may include subjecting to radiation at 365 nm or 400 nm or as is used commonly in the art.

Advantageously, as described further below, the composition according to this invention can be formed into films. The films thus formed from the composition of this invention exhibit hitherto unattainable combination of low dielectric properties and very high glass transition temperatures, among other improved properties. Accordingly, in some embodiments the film formed from the composition of this invention has dielectric constant (Dk) of 2.0 to 2.38 at a frequency of 10 GHz, a glass transition temperature from about 160° C. to about 350° C. and a coefficient of thermal expansion (CTE) from about 100 ppm/K to about 140 ppm/K. In some other embodiments the film formed from the composition of this invention has dielectric constant (Dk) of 2.10 to 2.30 at a frequency of 10 GHz, a glass transition temperature from about 190° C. to about 350° C. and a coefficient of thermal expansion (CTE) from about 80 ppm/K to about 140 ppm/K. In yet some other embodiments the film formed from the composition of this invention has a glass transition temperature from about 220° C. to about 350° C. or higher.

Advantageously it has further been found that the low dielectric properties of the films formed from the composition of this invention can be improved by incorporating one or more filler materials. The filler materials can either be organic or inorganic. Any of the known filler materials which bring about the intended benefit can be used herein.

Accordingly, in some embodiments, the film forming composition according to this invention comprises an inorganic filler. Suitable inorganic filler is the one which has a coefficient of thermal expansion (CTE) lower than that of the film formed from the composition of this invention. Non-limiting examples of such inorganic filler includes oxides such as silica, alumina, diatomaceous earth, titanium oxide, iron oxide, zinc oxide, magnesium oxide, metallic ferrite; hydroxides such as aluminum hydroxide, magnesium hydroxide; calcium carbonate (light and heavy); magnesium carbonate, dolomite; carbonates such as doronite; sulfates such as calcium sulfate, barium sulfate, ammonium sulfate, and calcium sulfite; talc, mica; clay; glass fibers; calcium silicate; montmorillonite; silicates such as bentonite; borates such as zinc borate, barium metaborate, aluminum borate, calcium borate, and sodium borate; carbon black; carbon such as carbon fibers; iron powder; copper powder, aluminum powder, zinc oxide; molybdenum sulfide; boronic fibers; potassium titanate; and lead zirconate.

In some other embodiments the film forming composition according to this invention further comprises an organic filler, which is generally a synthetic resin maybe in the form of a powder or can be in any other suitable form or a polymer. Examples of such polymeric fillers include without any limitation, poly(a-methylstyrene), poly(vinyl-toluene), copolymers of a-methylstyrene and vinyl-toluene, and the like. Further examples of such synthetic resin powder include powders of various thermosetting resins or thermoplastic resins such as alkyd resins, epoxy resins, silicone resins, phenolic resins, polyesters, acrylic and methacrylic resins, acetal resins, polyethylene, polyethers, polycarbonates, polyamides, polysulfones, polystyrenes, polyvinyl chlorides, fluororesins, polypropylene, ethylene-vinyl acetate copolymers, and powders of copolymers of these resins. Other examples of the organic filler include aromatic or aliphatic polyamide fibers, polypropylene fibers, polyester fibers, aramid fibers, and the like.

In some embodiments the filler is an inorganic filler. Thus, the coefficient of thermal expansion can be effectively reduced. Further, heat resistance can be improved. Accordingly, in some embodiments the inorganic filler is silica. Thus, the thermal expansion coefficient can be reduced while the dielectric characteristic is improved. Various forms of silica fillers are known in the art and all of such suitable silica fillers can be used in the composition of this invention. Examples of such silica filler include without any limitation fused silica, including fused spherical silica and fused crushed silica, crystalline silica, and the like. In some embodiments the filler employed is a fused silica. Advantageously it has now been observed that by employing spherical silica it is now possible to form composition containing the maximum filling amount, which can be as high as 80 weight percent. By using a suitable silica filler, dielectric properties can be made particularly excellent. Generally, the amount of filler material can vary from about 5 weight percent to 80 weight percent or higher. In some embodiments, the content of the filler in the composition is from about 30 to 80 weight percent, based on the total solid content of the composition when polymerized to form film/sheet as described herein. By appropriately adjusting the content of the filler, the balance between the dielectric property and the thermal expansion coefficient can be improved. In some other embodiments, the content of the filler in the composition is from about 40 to 70 weight percent, based on the total solid content of the composition.

In general, the filler is treated with a silane compound having an alkoxysilyl group and an organic functional group such as an alkyl group, an epoxy group, a vinyl group, a phenyl group and a styryl group in one molecule. Such silane compounds include, for example, a silane having an alkyl group such as ethyltriethoxysilane, propyltriethoxysilane or butyltriethoxysilane (alkylsilane), a silane having a phenyl group such as phenyltriethoxysilane, benzyltriethoxysilane or phenethyltriethoxysilane, a silane having a styryl group such as styryltrimethoxysilane, butenyltriethoxysilane, propenyltriethoxysilane or vinyltrimethoxysilane (vinylsilane), a silane having an acrylic or methacrylic group such as γ-(methacryloxypropyl) trimethoxysilane, a silane having an amino group such as γ-aminopropyltriethoxysilane, N-β (aminoethyl)-γ-aminopropyltrimethoxysilane, N-phenyl-γ-aminopropyltrimethoxysilane or an epoxy group such as γ-(3,4-epoxycyclohexyl) ureido triethoxysilane, and the like. Silanes having a mercapto group such as γ-mercaptopropyltrimethoxysilane or the like can also be used. It should further be noted that one or more of the aforementioned silane compounds can be used in any combination.

It should further be noted that, when an inorganic filler is used as the filler, the filler is generally treated with a "nonpolar silane compound". Thus, the adhesion between the cyclic olefin polymer formed from the composition of this invention and the filler can be improved. As a result, the mechanical characteristics of the molded body can be improved. Advantageously, it has now been observed that treatment with a "nonpolar silane compound" can eliminate or reduce adverse effects on dielectric properties. As used herein, "nonpolar silane compound" refers to a silane compound having no polar substituent. Polar substituents refer to groups that can be hydrogen-bonded or ionically dissociated. Such polar substituents include, but are not limited to, —OH, —COOH, —COOM, $NH_3$, $NR_4^+A^-$, —$CONH_2$, and the like. Where, M is a cation such as an alkali metal, an alkaline earth metal or a quaternary ammonium salt, R is H or an alkyl group having 8 or less carbon atoms, and A is an anion such as a halogen atom.

In some embodiments, the surface of the filler is modified with a vinyl group. It is advantageous to employ a vinyl group as it is a non-polar substituent, thus providing much needed low dielectric properties. In order to modify the surface of the filler with a vinyl group, for example, vinylsilane can be used. Specific examples of the vinylsilane are as described hereinabove.

In general, the average particle size of the filler used is in the range from about 0.1 to 10 μm. In some embodiments, it is from about 0.3 to 5 μm, and in some other embodiments it is from about 0.5 to 3 μm. The average particle size is defined as the average diameter of the particles as measured by the light scattering method. When more than one type of filler is used, the average particle diameter of one or more of such fillers is still within the aforementioned numerical range. Since the average particle diameter of the filler is suitably small, the specific surface area of the filler is reduced. As a result, the number of polar functional groups which may adversely affect the dielectric properties is reduced, and the dielectric properties are easily improved. In addition, when the average particle diameter of the filler is suitably small, it is easy to polymerize and form the films from the composition of this invention. Even more importantly, the films/sheets so formed exhibit much needed uniform thickness and flatness as is needed in many of the intended applications.

The composition of the present invention may contain components other than those described above. The components other than the above include a coupling agent, a flame retardant, a release agent, an antioxidant, and the like. Non-limiting examples of the coupling agent include, silane coupling agents, such as, vinylsilanes, acrylic and methacrylic silanes, styrylsilanes, isocyanatosilanes, and the like. Adhesion between the composition of this invention and a base material or the like can be improved by using a silane coupling agent.

Non-limiting examples of the flame retardant include a phosphorus-based flame retardant such as trixylenyl phosphate, dixylenyl phosphate, 10-(2,5-dihydroxyphenyl)-10H-9-oxa-10 phosphaphenanthrene-10-oxide, a halogen-based flame retardant such as a brominated epoxy resin, and an inorganic flame retardant such as aluminum hydroxide and magnesium hydroxide.

The composition of this invention may further include one or more compounds or additives having utility as, among other things, adhesion promoter, a surface leveling agent, a synergist, plasticizers, curing accelerators, free radical initiators, and the like.

Surprisingly, it has now been found that employing one or more thermal free radical generators it is now possible to accelerate the crosslinking of the polymer formed from the composition of this invention, resulting in a crosslinked polymer that exhibits much improved thermal properties. For example, both glass transition temperature ($T_g$) and temperature at which five weight percent weight loss occurs ($T_{d5}$) of the resulting polymer can be increased. Such increase in $T_g$ can be substantial and can range from about 10° C. to 50° C. In some embodiments the $T_g$ of the polymer is increased from 20° C. to 40° C. by employing suitable amounts of thermal free radical generator. Similarly, the $T_{d5}$ of the polymer can also be increased from about 3° C. to 10° C.

Any of the compounds which when exposed to heat forms a radical can be employed for this purpose. Suitable generic classes of such compounds include peroxides, peracids, azo compounds, N-alkoxyamines, N-acyloxyamines, and the like. Non-limiting examples of such specific thermal free radical generators include benzoyl peroxide, dicumyl peroxide (DCP), m-chloroperbenzoic acid, methyl ethyl ketone peroxide, azobisisobutyronitrile (AIBN), (1-phenyl-3,3-dipropyltriazene), (1-(phenyldiazenyl)pyrrolidine), (1-(phenyldiazenyl)piperidine), (1-(phenyldiazenyl)azepane), and the like.

Again, any of the suitable amounts of the thermal free radical generator can be employed in the composition of this invention which will bring about the intended effect. Generally, such amounts may vary from about 2 parts per hundred parts resin (pphr) to about 10 pphr or higher.

In some embodiments the amount of thermal radical generator employed is from about 3 pphr to about 6 pphr.

Non-limiting examples of the film forming composition according to this invention is selected from the group consisting of:

5-decylbicyclo[2.2.1]hept-2-ene (DecNB), 5-hexylbicyclo[2.2.1]hept-2-ene (HexNB), 1,4,4a,5,8,8a-hexahydro-1,4:5,8-dimethanonaphthalene (TDD), palladium (II) bis(tricyclohexylphosphine) diacetate (Pd785) and dimethylanilinium tetrakis(pentafluorophenyl)borate (DANFABA);

5-decylbicyclo[2.2.1]hept-2-ene (DecNB), 5-phenylbicyclo[2.2.1]hept-2-ene (PhNB), 1,4,4a,5,8,8a-hexahydro-1,4:5,8-dimethanonaphthalene (TDD), palladium (II) bis(tricyclohexylphosphine) diacetate (Pd785) and dimethylanilinium tetrakis(pentafluorophenyl)borate (DANFABA);

5-decylbicyclo[2.2.1]hept-2-ene (DecNB), 2,2'-bi(bicyclo[2.2.1]heptan-5-ene) (NBANB), 1,3-bis(2-(bicyclo[2.2.1]hept-5-en-2-yl)ethyl)-1,1,3,3-tetramethyldisiloxane (NBC2DMSC2NB), palladium (II) bis(tricyclohexylphosphine) diacetate (Pd785) and dimethylanilinium tetrakis(pentafluorophenyl)borate (DANFABA);

5-hexylbicyclo[2.2.1]hept-2-ene (HexNB), 2,2'-bi(bicyclo[2.2.1]heptan-5-ene) (NBANB), 1,3-bis(2-(bicyclo[2.2.1]hept-5-en-2-yl)ethyl)-1,1,3,3-tetramethyldisiloxane (NBC2DMSC2NB), palladium (II) bis(tricyclohexylphosphine) diacetate (Pd785) and dimethylanilinium tetrakis(pentafluorophenyl)borate (DANFABA);

3a,4,7,7a-tetrahydro-1H-4,7-methanoindene (DCPD), 5-hexylbicyclo[2.2.1]hept-2-ene (HexNB), palladium (II) bis(tricyclohexylphosphine) diacetate (Pd785) and dimethylanilinium tetrakis(pentafluorophenyl)borate (DANFABA); and 3a,4,7,7a-tetrahydro-1H-4,7-methanoindene (DCPD), 5-phenethylbicyclo[2.2.1]hept-2-ene (PENB), palladium (II) bis(tricyclohexylphosphine) diacetate (Pd785) and dimethylanilinium tetrakis(pentafluorophenyl)borate (DANFABA);

5-cyclohexylbicyclo[2.2.1]hept-2-ene (CyHexNB), 5-butylbicyclo[2.2.1]hept-2-ene (BuNB), palladium (II) bis(tricyclohexylphosphine) diacetate (Pd785) and dimethylanilinium tetrakis(pentafluorophenyl)borate (DANFABA);

5-cyclohexylbicyclo[2.2.1]hept-2-ene (CyHexNB), 5-butylbicyclo[2.2.1]hept-2-ene (BuNB), bicyclo[2.2.1]hepta-2,5-diene (NBD), palladium (II) bis(tricyclohexylphosphine) diacetate (Pd785) and dimethylanilinium tetrakis(pentafluorophenyl)borate (DANFABA);

1,2,3,4,4a,5,8,8a-octahydro-1,4:5,8-dimethanonaphthalene (TD), 5-butylbicyclo[2.2.1]hept-2-ene (BuNB), palladium (II) bis(tricyclohexylphosphine) diacetate (Pd785) and dimethylanilinium tetrakis(pentafluorophenyl)borate (DANFABA);

5-(cyclohex-3-en-1-yl)bicyclo[2.2.1]hept-2-ene (CyclohexeneNB), 5-butylbicyclo[2.2.1]hept-2-ene (BuNB), palladium (II) bis(tricyclohexylphosphine) diacetate (Pd785) and dimethylanilinium tetrakis(pentafluorophenyl)borate (DANFABA);

1,2,3,4,4a,5,8,8a-octahydro-1,4:5,8-dimethanonaphthalene (TD), 5-butylbicyclo[2.2.1]hept-2-ene (BuNB), bicyclo[2.2.1]hepta-2,5-diene (NBD), palladium (II) bis(tricyclohexylphosphine) diacetate (Pd785) and dimethylanilinium tetrakis(pentafluorophenyl)borate (DANFABA);

5-cyclohexylbicyclo[2.2.1]hept-2-ene (CyhexNB), 5-butylbicyclo[2.2.1]hept-2-ene (BuNB), 3a,4,4a,5,8,8a,9,9a-octahydro-1H-4,9:5,8-dimethanocyclopenta[b]naphthalene (CPD3), palladium (II) bis(tricyclohexylphosphine) diacetate (Pd785) and dimethylanilinium tetrakis(pentafluorophenyl)borate (DANFABA);

5-hexylbicyclo[2.2.1]hept-2-ene (HexNB), 3,3'-((oxybis(methylene))bis(4,1-phenylene))bis(3-(trifluoromethyl)-3H-diazirine) (Bis-diazirine ether), palladium (II) bis(tricyclohexylphosphine) diacetate (Pd785) and dimethylanilinium tetrakis(pentafluorophenyl)borate (DANFABA); and 5-hexylbicyclo[2.2.1]hept-2-ene (HexNB), 5-(but-3-en-1-yl)bicyclo[2.2.1]hept-2-ene (ButenylNB), palladium (II) bis(tricyclohexylphosphine) diacetate (Pd785) and dimethylanilinium tetrakis(pentafluorophenyl)borate (DANFABA);

5-butylbicyclo[2.2.1]hept-2-ene (BuNB), 5-(but-3-en-1-yl)bicyclo[2.2.1]hept-2-ene (ButenylNB), palladium (II) bis(tricyclohexylphosphine) diacetate (Pd785) and dimethylanilinium tetrakis(pentafluorophenyl)borate (DANFABA);

5-butylbicyclo[2.2.1]hept-2-ene (BuNB), 5-(but-3-en-1-yl)bicyclo[2.2.1]hept-2-ene (ButenylNB), dicumyl peroxide (DCP), palladium (II) bis(tricyclohexylphosphine) diacetate (Pd785) and dimethylanilinium tetrakis(pentafluorophenyl)borate (DANFABA); and 5-butylbicyclo[2.2.1]hept-2-ene (BuNB), 5-(but-3-en-1-yl)bicyclo[2.2.1]hept-2-ene (ButenylNB), dicumyl peroxide (DCP), silica (SC2300), palladium (II) bis(tricyclohexylphosphine) diacetate (Pd785) and dimethylanilinium tetrakis(pentafluorophenyl)borate (DANFABA).

It should be noted that the composition of this invention can be formed into any shape or form and not particularly limited to film. Accordingly, in some embodiments the composition of this invention can be formed into a sheet. The thickness of the sheet is not particularly limited, but when the application as a dielectric material is considered, the thickness is, for example, 0.01 to 0.5 mm. In some other embodiments the thickness is from about 0.02 to 0.2 mm. The sheet so formed generally does not substantially flow at room temperature (25° C. The sheet may be provided on an arbitrary carrier layer or may be provided alone. Examples of the carrier layer include a polyimide film or a glass sheet. Any other known peelable film substrates may be used as the carrier layer.

As described above, the film/sheet formed in accordance of this invention has good dielectric properties. In quantitative terms, the relative permittivity, i.e., the dielectric constant (Dk) of the film/sheet at a frequency of 10 GHz is from about 2.0 to 2.38. The dielectric loss tangent at a frequency of 10 GHz is from about 0.0003 to 0.005, and in some other embodiments it is from about 0.0004 to 0.003. As a result, the composition of the present invention finds applications in a variety of devices where such low dielectric materials are needed, such as for example the millimeter wave radar to an antenna, among others. See for example, JP 2018-109090 and JP 2003-216823. An antenna is usually composed of an insulator and a conductor layer (for example, copper foil). The composition or sheet of the present invention can be used as a part or the whole of the insulator. The antenna using the composition or the sheet of the present invention as a part or the whole of the insulator has good high-frequency characteristics and reliability (durability).

The conductor layer in the antenna is formed of, for example, a metal having desirable conductivity. A circuit is formed on the conductor layer by using a known circuit processing method. Conductors forming the conductor layer include various metals having conductivity, such as gold, silver, copper, iron, nickel, aluminum, or alloy metals thereof. As a method for forming the conductor layer, a known method can be used. Examples include vapor deposition, electroless plating, and electrolytic plating. Alternatively, the metal foil (for example, copper foil) may be pressure-bonded by thermocompression bonding. The metal foil constituting the conductor layer is generally a metal foil used for electrical connection. In addition to the copper foil, various metal foils such as gold, silver, nickel and aluminum can be used. It may also comprise an alloy foil substantially (for example, 98 wt % or more) composed of these metals. Among these metal foils, a copper foil is commonly used. The copper foil may be either a rolled copper foil or an electrolytic copper foil.

As noted, the composition of this invention is generally used as such to form a film or sheet. However, in some embodiments the composition may contain small quantities of solvent in order to dissolve the catalyst as described herein above. In addition, the composition of this invention can also be used as a low molecular weight varnish-type material for certain applications. In such applications suitable amount of the desirable solvents can be added so as maintain the solid content of the composition to about 10 to 70 weight percent when polymerized. Again, any of the solvents that are suitable to form such solutions can be used as a single solvent or a mixture of solvents as is needed for such application.

In a further aspect of this invention there is provided a kit for forming a film. There is dispensed in this kit a composition of this invention. Accordingly, in some embodiments there is provided a kit in which there is dispensed one or more olefinic monomers of formula (I) as described herein, one or more compounds of formulae (A1) or (A2) or (A3) as described herein, an organopalladium compound as described herein; and an activator as described herein. In some embodiments the kit of this invention contains more than one monomer of formula (I) in combination with more than one compound of formulae (A1) or (A2) or (A3) so as to obtain a desirable result and/or for intended purpose.

In another aspect of this embodiment of this invention the kit of this invention undergoes mass polymerization only when subjected to suitable temperature for a sufficient length of time to form a polymeric film. That is to say that the composition of this invention is poured onto a surface or onto a substrate which needs to be encapsulated and exposed to suitable thermal treatment in order for the monomers to undergo polymerization to form a solid polymer which could be in the form of a film or a sheet as described herein.

Generally, as already noted above, such polymerization can take place at various temperature conditions, such as for example heating, which can also be in stages, for example heating to 90° C., then at 110° C., and finally at 150° C. for sufficient length of time, for example 5 minutes to 2 hours at each temperature stage, and if necessary further heating to higher than 150° C. for various lengths of time such as from 5 minutes to 15 minutes and so on. Alternatively, the polymerization can be carried out at one single temperature from about 100° C. to 250° C. for sufficient length of time which can be from 1 hour to 3 hours or longer. By practice of this invention it is now possible to obtain polymeric films on such substrates which are substantially uniform film. The thickness of the film can be as desired and as specifically noted above, and may generally be in the range of 50 to 500 microns or higher.

While making a sheet and to secure the flatness of the sheet and suppressing unintended shrinkage, various heating methods known to make sheet materials may be employed. For example, it is possible to heat at a relatively low temperature at first, and then gradually raise the temperature. In order to ensure flatness or the like, heating may be performed by pressurizing with a flat plate (glass plate) or the like before heating and/or by pressurizing with a flat plate. The pressure used for such pressurization may be, for example, 0.1 to 8 MPa, and in some other embodiments it may range from about 0.3 to 5 MPa.

In some embodiments of this invention the kit as described herein encompasses a composition which contains two or more monomers of formula (I) and two or more compounds of formulae (A1) or (A2) or (A3) as described hereinabove. Again, any of the monomers of formula (I) or compounds of formulae (A1) or (A2) or (A3) as described herein can be used in this embodiment, and in any desirable amounts depending on the nature of the intended use.

In some embodiments, the kit as described herein encompasses various exemplary compositions as described hereinabove.

In yet another aspect of this invention there is further provided a method of forming a film for the fabrication of a variety of optoelectronic and/or automotive device comprising:

forming a homogeneous clear composition comprising one or more monomers of formula (I) in combination with one or more compounds of formulae (A1) or (A2) or (A3); an organopalladium compound as described herein; an activator as described herein; and optionally a filler as described herein;

coating a suitable substrate with the composition or pouring the composition onto a suitable substrate to form a film; and heating the film to a suitable temperature to cause polymerization of the monomers.

The coating of the desired substrate to form a film with the composition of this invention can be performed by any of the coating procedures as described herein and/or known to one skilled in the art, such as by spin coating. Other suitable coating methods include without any limitation spraying, doctor blading, meniscus coating, ink jet coating and slot coating. The mixture can also be poured onto a substrate to form a film. Suitable substrate includes any appropriate substrate as is, or may be used for electrical, electronic or optoelectronic devices, for example, a semiconductor substrate, a ceramic substrate, a glass substrate.

Next, the coated substrate is baked, i.e., heated to facilitate the mass polymerization, for example to a temperature from 50° C. to 150° C. for about 1 to 180 minutes, although other appropriate temperatures and times can be used. In some embodiments the substrate is baked at a temperature of from about 100° C. to about 120° C. for 120 minutes to 180 minutes. In some other embodiments the substrate is baked at a temperature of from about 110° C. to about 150° C. for 60 minutes to 120 minutes.

The films thus formed are then evaluated for their electrical properties using any of the methods known in the art. For example, the dielectric constant (Dk) or permittivity and dielectric loss tangent at a frequency of 10 GHz was measured using a device for measuring the permittivity by the cavity resonator method (manufactured by AET, conforming to JIS C 2565 standard). The coefficient of thermal expansion (CTE) was measured using a thermomechanical analysis apparatus (made by Seiko Instruments, SS 6000) in accordance with a measurement sample size of 4 mm (width)×40 mm (Length)×0.1 mm (thickness), a measurement temperature range of 30-350° C., and a temperature rising rate of 5° C./min. The coefficient of linear expansion from 50° C. to 100° C. was adopted as the coefficient of linear expansion. Generally, the films formed according to this invention exhibit excellent dielectric properties and can be tailored to desirable dielectric properties as described herein.

Accordingly, in some of the embodiments of this invention there is also provided a film or sheet obtained by the mass polymerization of the composition as described herein. In another embodiment there is also provided an electronic device comprising the film/sheet of this invention as described herein.

In an additional aspect of this invention there is also provided a composition comprising a polymer formed from any one or more monomers of formula (I) and at least one compound of formulae (A1) or (A2) or (A3). The composition thus formed can be crosslinked by subjecting it to a suitable temperature and/or photolytic condition as described herein to form a three dimensional object such as for example a film exhibiting superior properties as described herein.

The following examples are detailed descriptions of methods of preparation and use of certain compounds/monomers, polymers and compositions of the present invention. The detailed preparations fall within the scope of, and serve to exemplify, the more generally described methods of preparation set forth above. The examples are presented for illustrative purposes only, and are not intended as a restriction on the scope of the invention. As used in the examples and throughout the specification the ratio of monomer to catalyst is based on a mole to mole basis.

EXAMPLES (GENERAL)

The following abbreviations have been used hereinbefore and hereafter in describing some of the compounds, instruments and/or methods employed to illustrate certain of the embodiments of this invention:
PENB—5-phenethylbicyclo[2.2.1]hept-2-ene; PhNB—5-phenylbicyclo[2.2.1]hept-2-ene; DecNB—5-decylbicyclo[2.2.1]hept-2-ene; HexNB—5-hexylbicyclo[2.2.1]hept-2-ene; BuNB—5-butylbicyclo[2.2.1]hept-2-ene; ButenylNB—5-(but-3-en-1-yl)bicyclo[2.2.1]hept-2-ene; NBANB—2,2'-bi(bicyclo[2.2.1]heptan-5-ene; CyHexNB—5-cyclohexylbicyclo[2.2.1]hept-2-ene; DCPD—3a,4,7,7a-tetrahydro-1H-4,7-methanoindene; NBD—bicyclo[2.2.1]hepta-2,5-diene; TDD—1,4,4a,5,8,8a-hexahydro-1,4:5,8-dimethanonaphthalene; NBC2DMSC2NB—1,3-bis(2-(bicyclo[2.2.1]hept-5-en-2-yl)ethyl)-1,1,3,3-tetramethyldisiloxane; CPD3—3a,4,4a,5,8,8a,9,9a-octahydro-1H-4,9:5,8-dimethanocyclopenta[b]naphthalene; Pd785—palladium (II) bis(tricyclohexylphosphine) diacetate; DANFABA—dimethylanilinium tetrakis(pentafluorophenyl)borate; DCP—dicumyl peroxide; Bis-diazirine ether—3,3'-((oxybis(methylene))bis(4,1-phenylene))bis(3-(trifluoromethyl)-3H-diazirine); GEN-I BondLynx—3,3'-((perfluoropropane-2,2-diyl)bis(4,1-phenylene))bis(3-(trifluoromethyl)-3H-diazirine); MCH—cyclohexane; EA—ethyl acetate; THF—tetrahydrofuran; DSC—differential scanning calorimetry; TGA—thermogravimetric analysis; TMA—thermomechanical analysis; pphr—parts per hundred parts resin or parts per hundred parts of total monomers of formula (I).

Various monomers as used herein are either commercially available or can be readily prepared following the procedures as described in U.S. Pat. No. 9,944,818.

Example 1

Composition Containing
DecNB/HexNB/TDD—50:30:20 Molar Ratio

A mixture of Pd-785 (0.003 mmol) and DANFABA (0.15 mmol) were taken in a vial and mixed together inside a dry box and sealed. THF (0.24 g) was added to this vial by syringe transfer. The catalyst solution was then added to a mixture of DecNB (3.52 g, 15 mmol), HexNB (1.6 g, 9 mmol) and TDD (0.95 g, 6 mmol). The composition thus formed was coated on glass substrate using a doctor blade and cured in an oven at 110° C. for 3 hours in air to obtain a film of about 100-300 μm thick. The film was cut into rectangular strips and used for thermal and dielectric property measurements. The results are summarized in Table 1.

Example 2

Composition Containing
PhNB/DecNB/TDD—50:30:20 Molar Ratio

A mixture of Pd-785 (0.031 g) and DANFABA (0.176 g) were taken in a vial and mixed together inside a dry box and sealed. THF (3.2 g) was added to this vial by syringe transfer and 0.16 g of this solution was added to a mixture of exo-PhNB (2.13 g, 12.5 mmol), DecNB (1.76 g, 7 mmol) and TDD (0.79 g, 5 mmol). The composition thus formed was coated on glass substrate using a doctor blade and cured in an oven at 110° C. for 3 hours in air to obtain a film of about 100-300 μm thick. The film was cut into rectangular strips and used for thermal and dielectric property measurements. The results are summarized in Table 1.

Example 3

Composition Containing NBANB/HexNB/NBC2(DMS)2C2NB—50:30:20 Molar Ratio

A mixture of Pd-785 (0.031 g) and DANFABA (0.176 g) were taken in a vial and mixed together inside a dry box and sealed. THF (3.2 g) was added to this vial by syringe transfer and 0.16 g of this solution was added to a mixture of NBANB (1.88 g, 10 mmol), HexNB (1.07 g, 6 mmol) and NBC2(DMS)2C2NB (1.5 g, 4 mmol). The composition thus formed was then coated on glass substrate using a doctor blade and cured in an oven at 110° C. for 3 hours in air to obtain films of about 100-300 µm thick. The film was cut into rectangular strips and used for thermal and dielectric property measurements. The results are summarized in Table 1.

Example 4

Composition Containing NBANB/DecNB/NBC2(DMS)2C2NB—50:30:20 Molar Ratio

A mixture of Pd-785 (0.031 g) and DANFABA (0.176 g) were taken in a vial and mixed together inside a dry box and sealed. THF (3.2 g) was added to this vial by syringe transfer and 0.16 g of this solution was added to a mixture of NBANB (1.88 g, 10 mmol), DecNB (1.41 g, 6 mmol) and NBC2(DMS)2C2NB (1.5 g, 4 mmol). The composition thus formed was then coated on glass substrate using a doctor blade and cured in an oven at 110° C. for 3 hours in air to obtain films of about 100-300 µm thick. The film so formed was cut into rectangular strips and used for thermal and dielectric property measurements. The results are summarized in Table 1.

TABLE 1

| Example No | $T_g$ (° C.) | CTE (ppm/K) | Dk (10 GHz) | Df (10 GHz) |
|---|---|---|---|---|
| Example 1 | 192 | 154 | 2.24 | 0.0003 |
| Example 2 | 218 | 119 | 2.19 | 0.0007 |
| Example 3 | >350 | 108 | 2.33 | 0.002 |
| Example 4 | >320 | 102 | 2.30 | 0.001 |

Examples 5-8

Stock solutions of Pd-785 (1 weight percent in MCH) and DANFABA (5 weight percent in EA) were prepared in sealed vials. Then various compositions containing different monomers as described herein along with Pd-785 and DANFABA were prepared as follows: Example 5 contained CyHexNB/BuNB/NBD (50/40/10 molar ratio); Example 6 contained TD/BuNB/NBD (50/40/10 molar ratio); Example 7 contained CyHexNB/BuNB/CPD3 (50/40/10 molar ratio); and Example 8 contained CyHexNB/BuNB/CPD3 (50/40/10 molar ratio) with 4 parts per hundred DCP as a thermal radical initiator. Each of the compositions in Examples 5 to 8 contained monomer/Pd-785/DANFABA molar ratio of about 10,000/1/5. Each one of the compositions from Examples 5 to 8 were poured onto glass substrates and doctor-bladed to generate rectangular shapes of about 10 cm×6 cm and subsequently cured at 110° C. for 3 hours to form rectangular films of about 200-500 µm thickness. These films were further heated to about 120-150° C. for 3-6 hours under vacuum to remove any residual monomers present. The rectangular films were cut into smaller rectangles for TMA and electrical property measurements, dielectric constant (Dk) and dielectric loss factor (Df) at 10 GHz frequency. The glass transition temperatures ($T_g$), thermal decomposition temperature, measured by temperature at which 5 weight percent loss of the film occurs ($T_{d5}$), coefficient of thermal expansion (CTE), Dk and Df of the films are summarized in Table 2. It is evident from the data presented in Table 2, the films made from compositions of Example 5 to 8 exhibit of high $T_g$ ranging from 317° C. to 364° C., high $T_{d5}$ ranging from 284° C. to 301° C., low CTE ranging from 86 to 89 ppm/K, low Dk ranging from 2.2 to 2.36 and low Df ranging from 0.0008 to 0.0022. Furthermore when a second cure pathway to cross link the films to generate a thermoset was utilized by incorporating a thermal free radical generator such as DCP as in Example 8 where perhaps the second double bond of CPD3 undergo free radical initiated polymerization, which further decreases Df to 0.001 at 10 GHz when compared with the composition of Example 7 where such a second cure pathway to cross link the film was not utilized. The glass transition temperature of the composition of Example 8 is also higher than the composition of Example 7 indicating the formation of a more robust cross linked film.

TABLE 2

| Example Number | Composition | CTE (ppm/K) | $T_g$ (° C.) | $T_{d5}$ (° C.) | Dk at 10 GHz | Df at 10 GHz |
|---|---|---|---|---|---|---|
| Example 5 | CyHexNB/BuNB/NBD | 88 | 329 | 294 | 2.36 | 0.0008 |
| Example 6 | TD/BuNB/NBD | 86 | 317 | 301 | 2.23 | 0.0010 |
| Example 7 | CyHexNB/BuNB/CPD3 | 86 | 329 | 284 | 2.21 | 0.0022 |
| Example 8 | CyHexNB/BuNB/CPD3 | 89 | 364 | 288 | 2.20 | 0.0010 |

Examples 9-14

Stock solutions of Pd-785 (1 wt. % solution in MCH) and DANFABA (5 wt. % solution in EA were first prepared in sealed vials. Then various compositions were made by adding Pd-785 stock solution (0.08 g) and DANFABA stock solution (0.08 g) to samples of HexNB (1.68 g, 10 mmol). The monomer:Pd-785:DANFABA ratio was kept at about 10000:1:5. Various amounts of Bis-diazirine ether was then added as listed in Table 3 to each of these compositions. Each of these compositions was doctor-bladed separately on glass substrates and each cured for 3 hours at 130° C. Under this cure condition HexNB monomer is expected to mass-polymerize to poly-HexNB while at the same time Bis-diazirine ether decomposes to form a carbene intermediate that inserts to C—H bonds of pHexNB forming a cross linked network as described herein. The dielectric constant (Dk) and dielectric dissipation factor (Df) were measured at 10 GHz and lower Dk films were formed in all Examples 10 to 14 as evidenced from the data presented in Table 3. The appearance of a second glass transition temperature above 300° C. and the decrease in coefficient of thermal expansion (CTE) and disappearance of first glass transition temperature ($T_g$) were observed only when Bis-diazirine ether was present as measured by TMA. The TMA data summarized in Table 3 and the drawing further indicates that a cross linked network, i.e., a thermoset film is formed in the presence of Bis-diazirine ether.

TABLE 3

| Example No. | Bis-diazirine ether, mole % | Dk | Df | CTE (ppm/K) | $T_g$ (1) (° C.) | $T_g$ (2) (° C.) |
|---|---|---|---|---|---|---|
| Example 9 | 0 | 2.24 | 0.0003 | 183 | 243 | n.o. |
| Example 10 | 1.25 | 2.20 | 0.0014 | 178 | 230 | 310 |
| Example 11 | 2.5 | 2.31 | 0.0023 | 165 | 211 | 318 |
| Example 12 | 5 | 2.27 | 0.0029 | 109 | 186 | 318 |
| Example 13 | 10 | 2.16 | 0.0044 | n.m. | n.o. | n.o. |
| Example 14 | 20 | 2.27 | 0.0056 | 126 | n.o. | 334 | n.m.—not measured; n.o.—not observed

Example 15

A sample of poly-HexylNB having a weight average molecular weight ($M_w$) of about 224K (5 g) was dissolved in decane (20 g) to make a 20 wt. % solution. The solution was split into two equal portions, the first portion was designated as Example A. The second portion of this solution (10 g solution containing 2 g polymer) was mixed with Bis-diazirine ether (0.24 g, 12 pphr), and designated as Example 15B. Both solutions were filtered through 1μ PTFE filter. These solutions were spread on glass substrates followed by baking on a hot plate at 80-90° C. for 10 minutes to remove decane solvent while keeping the bake temperature low enough so that Bis-diazirine ether is not thermally decomposed. The films formed at about 100-200 μm thickness were exposed to i-line radiation at 365 nm wavelength at 1000 mJ/cm² dose. The exposed films were subjected to a post exposure bake step at 120° C. for 5 minutes. The film formed from the composition of Example 15A which contained no Bis-diazirine ether dissolved readily in THF indicating that there was no crosslinking during the photo-exposure step. On the other hand the film formed from the composition of Example 15B did not dissolve in THF. This clearly demonstrates that the film of Example 15B has photo-cured, due to the presence of Bis-diazirine ether forming a crosslinked network. The properties of these two films are summarized in Table 4.

TABLE 4

| Example No. | Bis-diazirine ether | THF solubility | Dk at 10 GHz | Df at 10 GHz |
|---|---|---|---|---|
| Example 15A | No | Yes | 2.12 | 0.0011 |
| Example 15B | Yes | No | 2.22 | 0.0040 |

Examples 16-21

Stock solutions of Pd-785 (1 weight percent in MCH) and DANFABA (5 weight percent in EA) were prepared in sealed vials. Then various compositions containing different monomers as described herein along with Pd-785 and DANFABA were prepared as follows: Example 16 contained HexNB/ButenylNB (80/20 molar ratio); Example 17 contained HexNB/ButenylNB (70/30 molar ratio); Example 18 contained BuNB/ButenylNB (80/20 molar ratio); Example 19 contained BuNB/ButenylNB (70/30 molar ratio); Example 20 contained BuNB/ButenylNB (70/30 molar ratio) and DCP (2 pphr) as a thermal free radical generator, Example 21 contained BuNB/ButenylNB (70/30 molar ratio), DCP (2 pphr) as a thermal free radical generator and silica nano particles (75 pphr, SC2300-SVJ). Sufficient amounts of Pd-785 in MCH and DANFABA in EA were added to each one of these compositions such that the monomer/Pd-785/DANFABA molar ratio was kept at about 10,000/1/5. Compositions from Examples 20 and 21 were poured onto glass substrates and doctor-bladed to generate rectangular shapes of about 10 cm×6 cm and subsequently cured at 120° C. for 3 hours (cure condition 1) to form rectangular films of about 100-300 μm thickness. Parts of these films were further heated to about 160° C. for 2 hours (cure condition 2). The rectangular films were cut into smallerrect angles for TMA, dielectric constant (Dk) and dielectric loss factor (Df) measurements at 10 GHz frequency. Table 5 summarizes the compositions and cure conditions of Examples 16-21. The glass transition temperatures ($T_g$), thermal decomposition temperature, measured by temperature at which 5 weight percent loss of the film occurs ($T_{d5}$), coefficient of thermal expansion (CTE), Dk and Df of the films at 10 GHz frequency are summarized in Table 6.

TABLE 5

| Example Number | Composition | Additive-1 | Additive-2 | Cure condition |
|---|---|---|---|---|
| Example 16A | HexNB/ButenylNB, 80/20 | — | — | 1 |
| Example 16B | HexNB/ButenylNB, 80/20 | | | 2 |
| Example 17A | HexNB/ButenylNB, 70/30 | — | — | 1 |
| Example 17B | HexNB/ButenylNB, 70/30 | | | 2 |
| Example 18A | BuNB/ButenylNB, 80/20 | — | — | 1 |
| Example 18B | BuNB/ButenylNB, 80/20 | | | 2 |
| Example 19A | BuNB/ButenylNB, 70/30 | — | — | 1 |
| Example 19B | BuNB/ButenylNB, 70/30 | | | 2 |
| Example 20A | BuNB/ButenylNB, 70/30 | 2 pphr DCP | — | 1 |
| Example 20B | BuNB/ButenylNB, 70/30 | 2 pphr DCP | — | 2 |
| Example 21 | BuNB/ButenylNB, 70/30 | 2 pphr DCP | 75 pphr SC2300 | 2 |

TABLE 6

| Example No. | CTE, ppm/K | $T_g$ ° C. | Dk | Df |
|---|---|---|---|---|
| Example 16A | 172 | 226 | 2.18 | 0.0007 |
| Example 16B | 179 | 224 | 2.22 | 0.0005 |
| Example 17A | 183 | 221 | 2.26 | 0.0009 |
| Example 17B | 183 | 219 | 2.13 | 0.0007 |
| Example 18A | 102 | 274 | 2.21 | 0.0018 |
| Example 18B | 136 | 273 | 2.51 | 0.0008 |
| Example 19A | 140 | 256 | 2.17 | 0.0013 |
| Example 19B | 117 | 256 | 1.94 | 0.0008 |
| Example 20A | 130 | 259 | 2.18 | 0.0016 |
| Example 20B | 124 | 263 | 2.01 | 0.0009 |
| Example 21 | 100 | >260 | 2.39 | 0.0011 |

Examples 22-25

A sample of poly-HexNB having a weight average molecular weight ($M_w$) of about 190,000 (15 g) was dissolved in decane (60 g) to make a 20 wt. % solution. 5 g portions of this stock solution containing 1 g poly-HexNB were used to make various compositions as follows:

Example 22 contained 10 pphr of Bis-diazirine ether; Example 23 contained 10 pphr GEN-I BondLynx; Example 24 contained 20 pphr of GEN-I BondLynx and additional 15 g of decane; and Example 25 contained 15 pphr GEN-I BondLynx. All compositions were filtered through 1 μm PTFE filters. Films at 150-200 μm thickness were formed by doctor-blade on glass substrates followed by a bake step on a hot plate at 80° C. for 5 minutes to remove the solvent. Films generated in Examples 22-24 were cut in half. One half of each of the films were exposed to 1500 mJ/cm² dose of i-line (365 nm wavelength) to affect photo-curing and the other half of each of the films were heated in an oven under nitrogen atmosphere at 130° C. for 30 minutes to affect thermal curing. The solubility of the films was tested by immersing small pieces of cured films in decane for about 1 hour. All films that were subjected to either photo or thermal cure did not dissolve in decane while a film that did not contain any bis-diazirine cross linker dissolved readily irrespective of whether those were subjected to photo or thermal cure steps. Dielectric constant (Dk) and dielectric dissipation factor (Df) were measured and listed in Table 7. The film of the Example 25 was further cured at 190° C. for 1.5 hours under vacuum to obtain cured films having thickness of about 140 μm and 160 μm. Dk and Df of these films were measured at 10 GHz, 35 GHz and 80 GHz and listed in Table 8.

TABLE 7

| Example No. | FT (μm) | Cure Condition | Dk @ 10 GHz | Df @ 10 GHz |
|---|---|---|---|---|
| Example 22 | 160 | Photo | 2.24 | 0.00297 |
| Example 23 | 165 | Photo | 2.24 | 0.00121 |
| Example 24A | 140 | Photo | 2.21 | 0.00153 |
| Example 24B | 140 | Thermal | 2.22 | 0.00161 |

TABLE 8

| Measurement Frequency | Film Thickness | Dk | Df |
|---|---|---|---|
| 10 GHz | 160 μm | 2.28 | 0.00186 |
| 35 GHz | 142 μm | 2.38 | 0.00160 |
| 80 GHz | 142 μm | 2.39 | 0.00160 |

It is evident from the data presented in Table 8 that the Df does not change much even at higher frequency which is surprising and offers advantageous benefits for various intended applications. That is, when a device operating at high frequency such as higher than 50 GHz the signal loss should be minimal for optimum performance, and that is what provided by the films formed from the compositions of this invention.

Examples 26-27

Compositions of Example 23and 24 were spin coated on 4" $SiO_2$ wafers at 500 rpm for 40 seconds and post apply baked (PAB) at 80° C. for 2 minutes. The film obtained from The Example 23 was exposed to 1000 mJ/cm² to i-line radiation (365 nm) through a mask to generate lines, pillars, trenches, and contact holes (CH). The film obtained from Example 24 was exposed to 791 mJ/cm² to i-line radiation through a mask to generate lines, pillars, trenches, and contact holes (CH). The exposed films were developed with decane to reveal the images of lines, pillars, trenches, and contact holes (CH). Table 9 summarizes the photo-imaging properties of these compositions.

TABLE 9

| Composition Example No. | Imaging Example No. | FT (μm) | Development time | FT loss | CH resolution |
|---|---|---|---|---|---|
| Example 23 | Example 26 | 1.25 | 30 sec | 6% | 10 μm |
| Example 24 | Example 27 | 0.61 | 15 sec | 13% | 15 μm |

FT—film thickness;
CH—contact hole

Although the invention has been illustrated by certain of the preceding examples, it is not to be construed as being limited thereby; but rather, the invention encompasses the generic area as hereinbefore disclosed. Various modifications and embodiments can be made without departing from the spirit and scope thereof.

What is claimed is:

1. A film forming composition comprising:
a) one or more olefinic monomers of the formula (I):

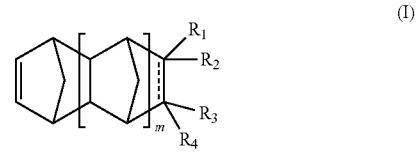

wherein:
m is 0 or 1;
----- is a single bond or a double bond;
$R_1$, $R_2$, $R_3$ and $R_4$ are the same or different and each independently selected from the group consisting of hydrogen, linear or branched ($C_4$-$C_{16}$)alkyl, linear or branched ($C_2$-$C_{16}$)alkenyl, ($C_3$-$C_{10}$)cycloalkyl, ($C_3$-$C_{10}$)cycloalkenyl, ($C_6$-$C_{12}$)bicycloalkyl, ($C_6$-$C_{12}$)aryl and ($C_6$-$C_{12}$)aryl($C_1$-$C_6$)alkyl; or
one of $R_1$ and $R_2$ taken together with one of $R_3$ and $R_4$ and the carbon atoms to which they are attached to form a substituted or unsubstituted ($C_5$-$C_{14}$)cyclic, ($C_5$-$C_{14}$) bicyclic or ($C_5$-$C_{14}$)tricyclic ring optionally containing one or more double bonds;
b) a compound selected from the group consisting of:
a compound of formula (A1):

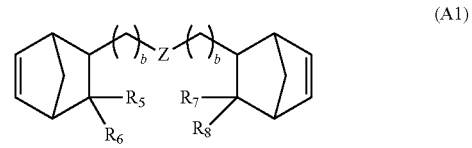

wherein:
b is an integer from 2 to 6;
Z is a bond or $R_9R_{10}SiOSiR_{11}R_{12}$, where each of $R_9$, $R_{10}$, $R_{11}$ and $R_{12}$ are the same or different and each independently of one another selected from the group consisting of methyl, ethyl and linear or branched ($C_3$-$C_6$)alkyl;
$R_5$, $R_6$, $R_7$ and $R_8$ are the same or different and each independently of one another selected from the group consisting of hydrogen, methyl, ethyl and linear or branched ($C_3$-$C_{16}$)alkyl;

a compound of formula (A2):

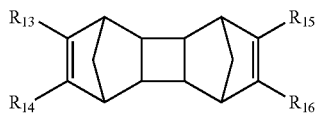

wherein
$R_{13}$, $R_{14}$, $R_{15}$ and $R_{16}$ are the same or different and each independently of one another selected from the group consisting of hydrogen, methyl, ethyl and linear or branched ($C_3$-$C_{16}$)alkyl; and a compound of formula ($A_3$):

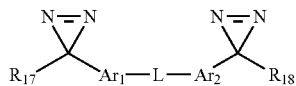

wherein
L is a bond or a divalent linking or a spacer group selected from:
methylene, ethylene, linear or branched ($C_3$-$C_{16}$)alkylene, ($C_3$-$C_{16}$)cycloalkylene, ($C_5$-$C_8$)heterocycle, ($C_6$-$C_{12}$)arylene, ($C_5$-$C_{12}$)heteroarylene and —($CH_2$)$_c$O($CH_2$)$_c$—, where c is an integer from 1 to 6 and optionally each of $CH_2$ may be substituted with methyl, ethyl, linear or branched ($C_3$-$C_{16}$)alkyl, and ($C_6$-$C_{12}$)aryl, and wherein optionally portions of hydrogen on methylene, ethylene or ($C_3$-$C_{16}$)alkylene are replaced with a group selected from the group consisting of fluorine, trifluoromethyl, pentafluoroethyl and linear or branched perfluoro($C_3$-$C_{16}$)alkyl;

$R_{17}$ and $R_{18}$ are the same or different and each is independently selected from methyl, ethyl, linear or branched ($C_3$-$C_{12}$)alkyl, ($C_6$-$C_{12}$)aryl and ($C_6$-$C_{12}$)aryl($C_1$-$C_{12}$)alkyl, where optionally portions of hydrogen on methyl, ethyl or ($C_3$-$C_{12}$)alkyl are replaced with a group selected from the group consisting of fluorine, trifluoromethyl, pentafluoroethyl and linear or branched ($C_3$-$C_{12}$)perfluoroalkyl;

$Ar_1$ and $Ar_2$ are the same or different and each is independently selected from ($C_6$-$C_{12}$)arylene or ($C_6$-$C_{12}$)heteroarylene group optionally substituted with a group selected from ($C_1$-$C_4$)alkyl, ($C_1$-$C_4$)alkoxy, ($C_6$-$C_{10}$)aryl, ($C_6$-$C_{12}$)aryloxy, ($C_6$-$C_{12}$)aryl($C_1$-$C_4$)alkyl and ($C_6$-$C_{12}$)aryl($C_1$-$C_4$)alkyloxy;

c) an organopalladium compound selected from the group consisting of:
palladium (II) bis(triphenylphosphine) dichloride;
palladium (II) bis(triphenylphosphine) dibromide;
palladium (II) bis(triphenylphosphine) diacetate;
palladium (II) bis(triphenylphosphine) bis(trifluoroacetate);
palladium (II) bis(tricyclohexylphosphine) dichloride;
palladium (II) bis(tricyclohexylphosphine) dibromide;
palladium (II) bis(tricyclohexylphosphine) diacetate (Pd785);
palladium (II) bis(tricyclohexylphosphine) bis(trifluoroacetate);
palladium (II) bis(tri-p-tolylphosphine) dichloride;
palladium (II) bis(tri-p-tolylphosphine) dibromide;
palladium (II) bis(tri-p-tolylphosphine) diacetate;
palladium (II) bis(tri-p-tolylphosphine) bis(trifluoroacetate);
palladium (II) ethyl hexanoate;
dichloro bis(acetonato)palladium (II);
dichloro bis(benzonitrile)palladium (II);
platinum (II) chloride;
platinum (II) bromide; and
platinum bis(triphenylphosphine)dichloride; and d) an activator selected from the group consisting of:
lithium tetrafluoroborate;
lithium triflate;
lithium tetrakis(pentafluorophenyl)borate;
lithium tetrakis(pentafluorophenyl)borate etherate (Li-FABA);
lithium tetrakis(pentafluorophenyl)borate isopropanolate;
lithium tetraphenylborate;
lithium tetrakis(3,5-bis(trifluoromethyl)phenyl)borate;
lithium tetrakis(2-fluorophenyl)borate;
lithium tetrakis(3-fluorophenyl)borate;
lithium tetrakis(4-fluorophenyl)borate;
lithium tetrakis(3,5-difluorophenyl)borate;
lithium hexafluorophosphate;
lithium hexaphenylphosphate;
lithium hexakis(pentafluorophenyl)phosphate;
lithium hexafluoroarsenate;
lithium hexaphenylarsenate;
lithium hexakis(pentafluorophenyl)arsenate;
lithium hexakis(3,5-bis(trifluoromethyl)phenyl)arsenate;
lithium hexafluoroantimonate;
lithium hexaphenylantimonate;
lithium hexakis(pentafluorophenyl)antimonate;
lithium hexakis(3,5-bis(trifluoromethyl)phenyl)antimonate;
lithium tetrakis(pentafluorophenyl)aluminate;
lithium tris(nonafluorobiphenyl)fluoroaluminate;
lithium (octyloxy)tris(pentafluorophenyl)aluminate;
lithium tetrakis(3,5-bis(trifluoromethyl)phenyl)aluminate;
lithium methyltris(pentafluorophenyl)aluminate;
dimethylanilinium tetrakis(pentafluorophenyl)borate (DANFABA); and wherein the film formed from the composition has a dielectric constant (Dk) less than 2.4 at a frequency of 10 GHz, a glass transition temperature greater than 150° C. and a coefficient of thermal expansion (CTE) less than 150 ppm/K.

2. The film forming composition according to claim 1, wherein
m is 0;
===== is a single bond;
$R_1$, $R_2$, $R_3$ and $R_4$ are the same or different and each independently selected from the group consisting of hydrogen, n-butyl, n-hexyl, cyclohexyl, cyclohexenyl and norbornyl.

3. The film forming composition according to claim 1, wherein the monomer of formula (I) is selected from the group consisting of:

bicyclo[2.2.1]hept-2-ene (norbornene or NB);

-continued

bicyclo[2.2.1]hepta-2,5-diene (norbornadiene or NBD);

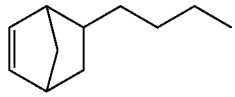

5-butylbicyclo[2.2.1]hept-2-ene (BuNB);

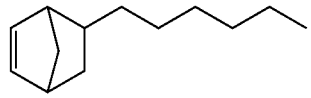

5-hexylbicyclo[2.2.1]hept-2-ene (HexNB);

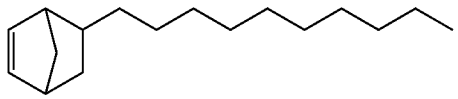

5-decylbicyclo[2.2.1]hept-2-ene (DecNB);

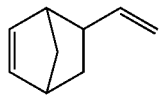

5-vinylbicyclo[2.2.1]hept-2-ene (VNB);

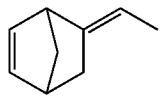

5-ethylidenebicyclo[2.2.1]hept-2-ene (ENB);

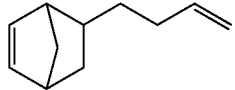

5-(but-3-en-1-yl)bicyclo[2.2.1]hept-2-ene (ButenylNB);

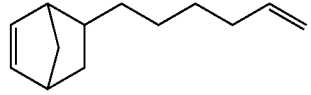

5-(hex-5-en-1-yl)bicyclo[2.2.1]hept-2-ene (HexenylNB);

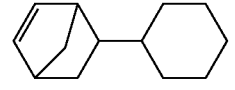

5-cyclohexylbicyclo[2.2.1]hept-2-ene (CyHexNB);

5-(cyclohex-3-en-1-yl)bicyclo[2.2.1]hept-2-ene (CyclohexeneNB);

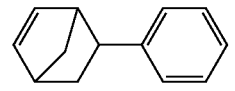

5-phenylbicyclo[2.2.1]hept-2-ene (PhNB);

5-phenethylbicyclo[2.2.1]hept-2-ene (PENB);

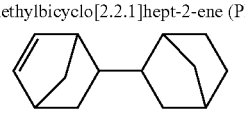

2,2'-bi(bicyclo[2.2.1]heptan-5-ene) (NBANB);

-continued

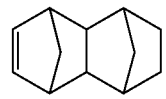

1,2,3,4,4a,5,8,8a-octahydro-1,4:5,8-dimethanonaphthalene (TD);

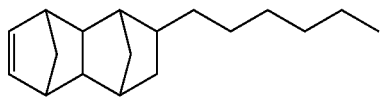

2-hexyl-1,2,3,4,4a,5,8,8a-octahydro-1,4:5,8-dimethanonaphthalene (HexTD);

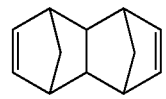

1,4,4a,5,8,8a-hexahydro-1,4:5,8-dimethanonaphthalene (TDD);

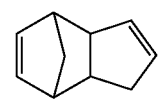

3a,4,7,7a-tetrahydro-1H-4,7-methanoindene (DCPD); and

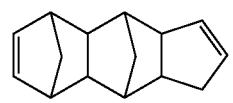

3a,4,4a,5,8,8a,9,9a-octahydro-1H-4,9:5,8-dimethanocyclopenta[b]naphthalene (CPD3).

4. The film forming composition according to claim 1, wherein the compound of formula (A1) or (A3) is selected from the group consisting of:

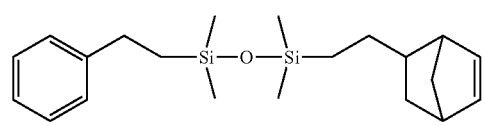

1,3-bis(2-(bicyclo[2.2.1]hept-5-en-2-yl)ethyl)-1,1,3,3-tetramethyldisiloxane (NBC2DMSC2NB);

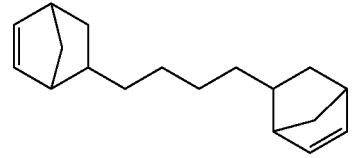

1,4-di(bicyclo[2.2.1]hept-5-en-2-yl)butane (NBC4NB);

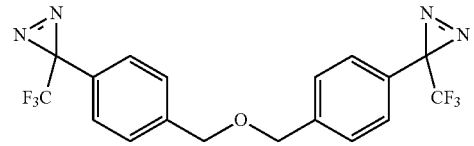

3,3'-((oxybis(methylene))bis(4,1-phenylene))bis(3-(trifluoromethyl)-3H-diazirine);

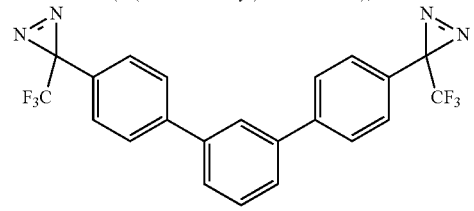

4,4''-bis(3-(trifluoromethyl)-3H-diazirin-3-yl)-1,1':3',1''-terphenyl;

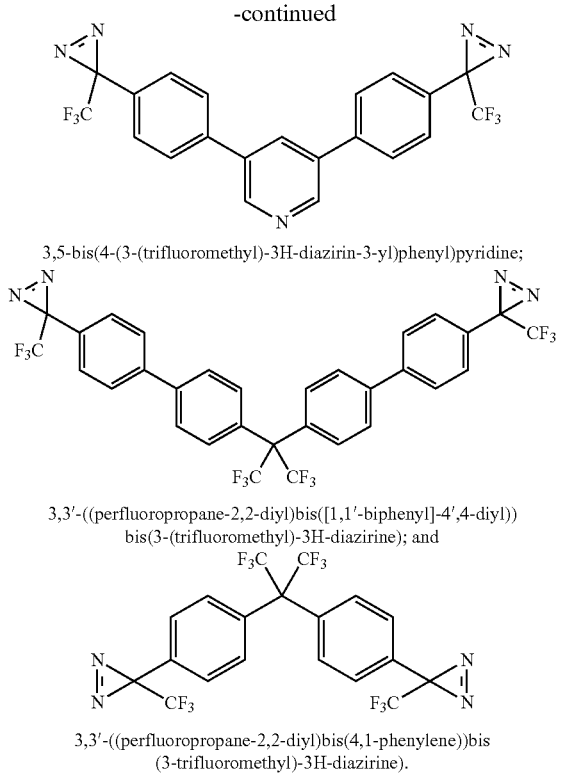

3,5-bis(4-(3-(trifluoromethyl)-3H-diazirin-3-yl)phenyl)pyridine;

3,3'-((perfluoropropane-2,2-diyl)bis([1,1'-biphenyl]-4',4-diyl))bis(3-(trifluoromethyl)-3H-diazirine); and 3,3'-((perfluoropropane-2,2-diyl)bis(4,1-phenylene))bis(3-(trifluoromethyl)-3H-diazirine).

5. The film forming composition according to claim 1, wherein the compound of formula ($A_2$) is:

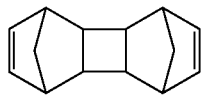 [SMILES: C1=CC2CC1C1C2C2C3C=CC(C3)C12]

1,4,4a,4b,5,8,8a,8b-octahydro-1,4:5,8-dimethanobiphenylene ((NBD)2).

6. The film forming composition according to claim 1, wherein the composition contains at least one monomer of formula (I) and one compound of formula (A1) or (A2) or (A3).

7. The film forming composition according to claim 1, wherein the film formed from the composition has dielectric constant (Dk) of 2.0 to 2.38 at a frequency of 10 GHz, a glass transition temperature from about 160° C. to about 350° C. and a coefficient of thermal expansion (CTE) from about 100 ppm/K to about 140 ppm/K.

8. The film forming composition according to claim 1, which further comprises an inorganic filler.

9. The film forming composition according to claim 1, which further comprises an organic filler.

10. The film forming composition according to claim 1, which is selected from the group consisting of:
   5-decylbicyclo[2.2.1]hept-2-ene (DecNB), 5-hexylbicyclo[2.2.1]hept-2-ene (HexNB), 1,4,4a,5,8,8a-hexahydro-1,4:5,8-dimethanonaphthalene (TDD), palladium (II) bis(tricyclohexylphosphine) diacetate (Pd785) and dimethylanilinium tetrakis(pentafluorophenyl)borate (DANFABA);
   5-decylbicyclo[2.2.1]hept-2-ene (DecNB), 5-phenylbicyclo[2.2.1]hept-2-ene (PhNB), 1,4,4a,5,8,8a-hexahydro-1,4:5,8-dimethanonaphthalene (TDD), palladium (II) bis(tricyclohexylphosphine) diacetate (Pd785) and dimethylanilinium tetrakis(pentafluorophenyl)borate (DANFABA);
   5-decylbicyclo[2.2.1]hept-2-ene (DecNB), 2,2'-bi(bicyclo[2.2.1]heptan-5-ene) (NBANB), 1,3-bis(2-(bicyclo[2.2.1]hept-5-en-2-yl)ethyl)-1,1,3,3-tetramethyldisiloxane (NBC2DMSC2NB), palladium (II) bis(tricyclohexylphosphine) diacetate (Pd785) and dimethylanilinium tetrakis(pentafluorophenyl)borate (DANFABA);
   5-hexylbicyclo[2.2.1]hept-2-ene (HexNB), 2,2'-bi(bicyclo[2.2.1]heptan-5-ene) (NBANB), 1,3-bis(2-(bicyclo[2.2.1]hept-5-en-2-yl)ethyl)-1,1,3,3-tetramethyldisiloxane (NBC2DMSC2NB), palladium (II) bis(tricyclohexylphosphine) diacetate (Pd785) and dimethylanilinium tetrakis(pentafluorophenyl)borate (DANFABA);
   3a,4,7,7a-tetrahydro-1H-4,7-methanoindene (DCPD), 5-hexylbicyclo[2.2.1]hept-2-ene (HexNB), palladium (II) bis(tricyclohexylphosphine) diacetate (Pd785) and dimethylanilinium tetrakis(pentafluorophenyl)borate (DANFABA); and
   3a,4,7,7a-tetrahydro-1H-4,7-methanoindene (DCPD), 5-phenethylbicyclo[2.2.1]hept-2-ene (PENB), palladium (II) bis(tricyclohexylphosphine) diacetate (Pd785) and dimethylanilinium tetrakis(pentafluorophenyl)borate (DANFABA);
   5-cyclohexylbicyclo[2.2.1]hept-2-ene (CyHexNB), 5-butylbicyclo[2.2.1]hept-2-ene (BuNB), palladium (II) bis(tricyclohexylphosphine) diacetate (Pd785) and dimethylanilinium tetrakis(pentafluorophenyl)borate (DANFABA);
   5-cyclohexylbicyclo[2.2.1]hept-2-ene (CyHexNB), 5-butylbicyclo[2.2.1]hept-2-ene (BuNB), bicyclo[2.2.1]hepta-2,5-diene (NBD), palladium (II) bis(tricyclohexylphosphine) diacetate (Pd785) and dimethylanilinium tetrakis(pentafluorophenyl)borate (DANFABA);
   1,2,3,4,4a,5,8,8a-octahydro-1,4:5,8-dimethanonaphthalene (TD), 5-butylbicyclo[2.2.1]hept-2-ene (BuNB), palladium (II) bis(tricyclohexylphosphine) diacetate (Pd785) and dimethylanilinium tetrakis(pentafluorophenyl)borate (DANFABA);
   5-(cyclohex-3-en-1-yl)bicyclo[2.2.1]hept-2-ene (CyclohexeneNB), 5-butylbicyclo[2.2.1]hept-2-ene (BuNB), palladium (II) bis(tricyclohexylphosphine) diacetate (Pd785) and dimethylanilinium tetrakis(pentafluorophenyl)borate (DANFABA);
   1,2,3,4,4a,5,8,8a-octahydro-1,4:5,8-dimethanonaphthalene (TD), 5-butylbicyclo[2.2.1]hept-2-ene (BuNB), bicyclo[2.2.1]hepta-2,5-diene (NBD), palladium (II) bis(tricyclohexylphosphine) diacetate (Pd785) and dimethylanilinium tetrakis(pentafluorophenyl)borate (DANFABA); and
   5-cyclohexylbicyclo[2.2.1]hept-2-ene (CyhexNB), 5-butylbicyclo[2.2.1]hept-2-ene (BuNB), 3a,4,4a,5,8,8a,9,9a-octahydro-1H-4,9:5,8-dimethanocyclopenta[b]naphthalene (CPD3), palladium (II) bis(tricyclohexylphosphine) diacetate (Pd785) and dimethylanilinium tetrakis(pentafluorophenyl)borate (DANFABA).

11. A kit for forming a film comprising a composition comprising:

a) one or more olefinic monomers of the formula (I):

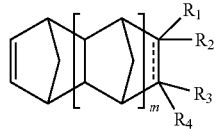
(I)

wherein:

m is 0 or 1;

╌╌╌╌ is a single bond or a double bond;

$R_1$, $R_2$, $R_3$ and $R_4$ are the same or different and each independently selected from the group consisting of hydrogen, linear or branched $(C_4-C_{16})$alkyl, linear or branched $(C_2-C_{16})$alkenyl, $(C_3-C_{10})$cycloalkyl, $(C_3-C_{10})$cycloalkenyl, $(C_6-C_{12})$bicycloalkyl, $(C_6-C_{12})$aryl and $(C_6-C_{12})$aryl$(C_1-C_6)$alkyl; or one of $R_1$ and $R_2$ taken together with one of $R_3$ and $R_4$ and the carbon atoms to which they are attached to form a substituted or unsubstituted $(C_5-C_{14})$cyclic, $(C_5-C_{14})$bicyclic or $(C_5-C_{14})$tricyclic ring optionally containing one or more double bonds;

b) a compound selected from the group consisting of:

a compound of formula (A1):

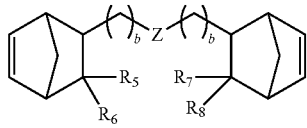
(A1)

wherein:

b is an integer from 2 to 6;

Z is a bond or $R_9R_{10}SiOSiR_{11}R_{12}$, where each of $R_9$, $R_{10}$, $R_{11}$ and $R_{12}$ are the same or different and each independently of one another selected from the group consisting of methyl, ethyl and linear or branched $(C_3-C_6)$alkyl;

$R_5$, $R_6$, $R_7$ and $R_8$ are the same or different and each independently of one another selected from the group consisting of hydrogen, methyl, ethyl and linear or branched $(C_3-C_{16})$alkyl; and a compound of formula (A2):

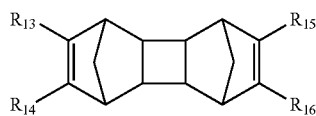
(A2)

wherein $R_{13}$, $R_{14}$, $R_{15}$ and $R_{16}$ are the same or different and each independently of one another selected from the group consisting of hydrogen, methyl, ethyl and linear or branched $(C_3-C_{16})$alkyl; and a compound of formula (A3):

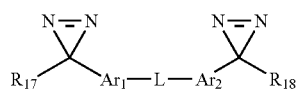
(A3)

wherein

L is a bond or a divalent linking or a spacer group selected from:

methylene, ethylene, linear or branched $(C_3-C_{16})$alkylene, $(C_3-C_{16})$cycloalkylene, $(C_5-C_8)$heterocycle, $(C_6-C_{12})$arylene, $(C_5-C_{12})$heteroarylene and —$(CH_2)_c$O$(CH_2)_c$—, where c is an integer from 1 to 6 and optionally each of $CH_2$ may be substituted with methyl, ethyl, linear or branched $(C_3-C_{16})$alkyl, and $(C_6-C_{12})$aryl, and wherein optionally portions of hydrogen on methylene, ethylene or $(C_3-C_{16})$alkylene are replaced with a group selected from the group consisting of fluorine, trifluoromethyl, pentafluoroethyl and linear or branched perfluoro$(C_3-C_{16})$alkyl;

$R_{17}$ and $R_{18}$ are the same or different and each is independently selected from methyl, ethyl, linear or branched $(C_3-C_{12})$alkyl, $(C_6-C_{12})$aryl and $(C_6-C_{12})$aryl$(C_1-C_{12})$alkyl, where optionally portions of hydrogen on methyl, ethyl or $(C_3-C_{12})$alkyl are replaced with a group selected from the group consisting of fluorine, trifluoromethyl, pentafluoroethyl and linear or branched $(C_3-C_{12})$perfluoroalkyl;

$Ar_1$ and $Ar_2$ are the same or different and each is independently selected from $(C_6-C_{12})$arylene or $(C_6-C_{12})$heteroarylene group optionally substituted with a group selected from $(C_1-C_4)$alkyl, $(C_1-C_4)$alkoxy, $(C_6-C_{10})$aryl, $(C_6-C_{12})$aryloxy, $(C_6-C_{12})$aryl$(C_1-C_4)$alkyl and $(C_6-C_{12})$aryl$(C_1-C_4)$alkyloxy;

c) an organopalladium compound selected from the group consisting of:

palladium (II) bis(triphenylphosphine) dichloride;
palladium (II) bis(triphenylphosphine) dibromide;
palladium (II) bis(triphenylphosphine) diacetate;
palladium (II) bis(triphenylphosphine) bis(trifluoroacetate);
palladium (II) bis(tricyclohexylphosphine) dichloride;
palladium (II) bis(tricyclohexylphosphine) dibromide;
palladium (II) bis(tricyclohexylphosphine) diacetate (Pd785);
palladium (II) bis(tricyclohexylphosphine) bis(trifluoroacetate);
palladium (II) bis(tri-p-tolylphosphine) dichloride;
palladium (II) bis(tri-p-tolylphosphine) dibromide;
palladium (II) bis(tri-p-tolylphosphine) diacetate;
palladium (II) bis(tri-p-tolylphosphine) bis(trifluoroacetate);
palladium (II) ethyl hexanoate;
dichloro bis(acetonato)palladium (II);
dichloro bis(benzonitrile)palladium (II);
platinum (II) chloride;
platinum (II) bromide; and
platinum bis(triphenylphosphine)dichloride; and d) an activator is selected from the group consisting of:
lithium tetrafluoroborate;
lithium triflate;
lithium tetrakis(pentafluorophenyl)borate;
lithium tetrakis(pentafluorophenyl)borate etherate (Li-FABA);

lithium tetrakis(pentafluorophenyl)borate isopropanolate;
lithium tetraphenylborate;
lithium tetrakis(3,5-bis(trifluoromethyl)phenyl)borate;
lithium tetrakis(2-fluorophenyl)borate;
lithium tetrakis(3-fluorophenyl)borate;
lithium tetrakis(4-fluorophenyl)borate;
lithium tetrakis(3,5-difluorophenyl)borate;
lithium hexafluorophosphate;
lithium hexaphenylphosphate;
lithium hexakis(pentafluorophenyl)phosphate;
lithium hexafluoroarsenate;
lithium hexaphenylarsenate;
lithium hexakis(pentafluorophenyl)arsenate;
lithium hexakis(3,5-bis(trifluoromethyl)phenyl)arsenate;
lithium hexafluoroantimonate;
lithium hexaphenylantimonate;
lithium hexakis(pentafluorophenyl)antimonate;
lithium hexakis(3,5-bis(trifluoromethyl)phenyl)antimonate;
lithium tetrakis(pentafluorophenyl)aluminate;
lithium tris(nonafluorobiphenyl)fluoroaluminate;
lithium (octyloxy)tris(pentafluorophenyl)aluminate;
lithium tetrakis(3,5-bis(trifluoromethyl)phenyl)aluminate;
lithium methyltris(pentafluorophenyl)aluminate;
dimethylanilinium tetrakis(pentafluorophenyl)borate (DANFABA); and e) a filler, wherein the film formed from the composition has a dielectric constant (Dk) less than 2.4 at a frequency of 10 GHz, a glass transition temperature greater than 150° C. and a coefficient of thermal expansion (CTE) less than 150 ppm/K.

12. The kit according to claim 11, wherein m is 0;

----- is a single bond;

$R_1$, $R_2$, $R_3$ and $R_4$ are the same or different and each independently selected from the group consisting of hydrogen, n-butyl, n-hexyl, cyclohexyl, cyclohexenyl and norbornyl.

13. The kit according to claim 11, wherein the monomer of formula (I) is selected from the group consisting of:

bicyclo[2.2.1]hept-2-ene (norbornene or NB);

bicyclo[2.2.1]hepta-2,5-diene (norbornadiene or NBD);

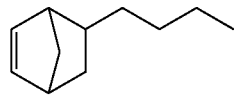

5-butylbicyclo[2.2.1]hept-2-ene (BuNB);

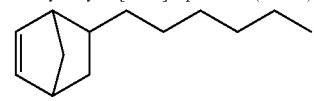

5-hexylbicyclo[2.2.1]hept-2-ene (HexNB);

-continued

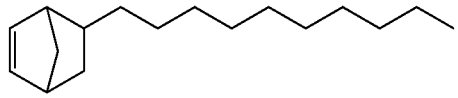

5-decylbicyclo[2.2.1]hept-2-ene (DecNB);

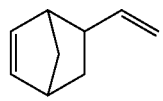

5-vinylbicyclo[2.2.1]hept-2-ene (VNB);

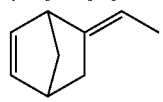

5-ethylidenebicyclo[2.2.1]hept-2-ene (ENB);

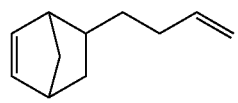

5-(but-3-en-1-yl)bicyclo[2.2.1]hept-2-ene (ButenylNB);

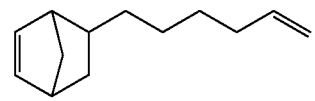

5-(hex-5-en-1-yl)bicyclo[2.2.1]hept-2-ene (HexenylNB);

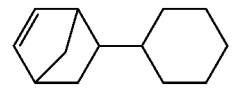

5-cyclohexylbicyclo[2.2.1]hept-2-ene (CyHexNB);

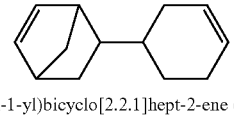

5-(cyclohex-3-en-1-yl)bicyclo[2.2.1]hept-2-ene (CyclohexeneNB);

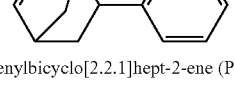

5-phenylbicyclo[2.2.1]hept-2-ene (PhNB);

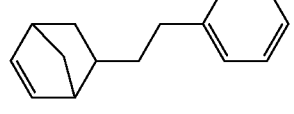

5-phenethylbicyclo[2.2.1]hept-2-ene (PENB);

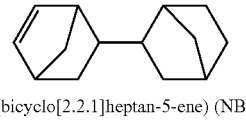

2,2'-bi(bicyclo[2.2.1]heptan-5-ene) (NBANB);

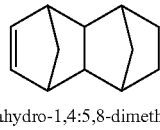

1,2,3,4,4a,5,8,8a-octahydro-1,4:5,8-dimethanonaphthalene (TD);

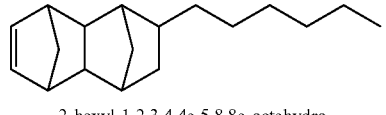

2-hexyl-1,2,3,4,4a,5,8,8a-octahydro-1,4:5,8-dimethanonaphthalene (HexTD);

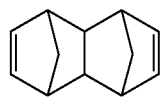

1,4,4a,5,8,8a-hexahydro-1,4:5,8-dimethanonaphthalene (TDD);

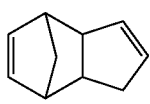

3a,4,7,7a-tetrahydro-1H-4,7-methanoindene (DCPD); and

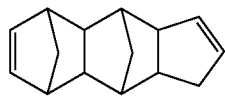

3a,4,4a,5,8,8a,9,9a-octahydro-1H-4,9:5,8-
dimethanocyclopenta[b]naphthalene (CPD3).

14. The kit according to claim 11, wherein the compound of formula (A1) or (A3) is selected from the group consisting of:

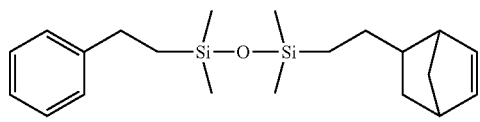

1,3-bis(2-(bicyclo[2.2.1]hept-5-en-2-yl)ethyl)-1,1,3,3-tetramethyldisiloxane (NBC2DMSC2NB);

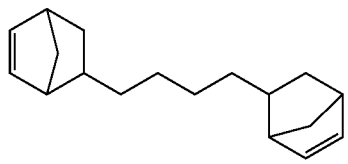

1,4-di(bicyclo[2.2.1]hept-5-en-2-yl)butane (NBC4NB);

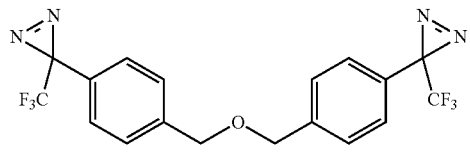

3,3'-((oxybis(methylene))bis(4,1-phenylene))bis
(3-(trifluoromethyl)-3H-diazirine);

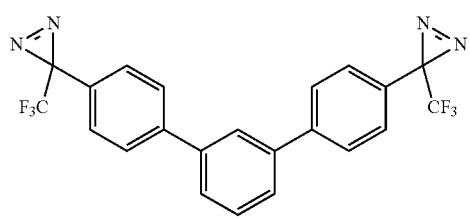

4,4''-bis(3-(trifluoromethyl)-3H-diazirin-3-yl)-1,1':3',1''-terphenyl;

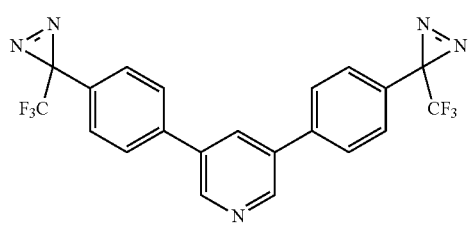

3,5-bis(4-(3-(trifluoromethyl)-3H-diazirin-3-yl)phenyl)pyridine;

3,3'-((perfluoropropane-2,2-diyl)bis([1,1'-biphenyl]-4',4-diyl))
bis(3-(trifluoromethyl)-3H-diazirine); and

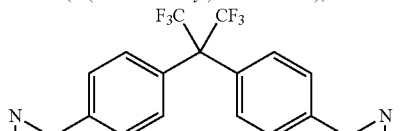

3,3'-((perfluoropropane-2,2-diyl)bis(4,1-phenylene))bis
(3-(trifluoromethyl)-3H-diazirine).

15. The kit according to claim 11, wherein the compound of formula (A2) is:

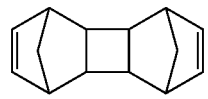

1,4,4a,4b,5,8,8a,8b-octahydro-1,4:5,8-dimethanobiphenylene ((NBD)2).

16. The kit according to claim 11, wherein the composition contains at least one monomer of formula (I) and one compound of formula (A1) or (A2) or (A3).

17. The kit according to claim 11, wherein the film formed from the composition has dielectric constant (Dk) of 2.0 to 2.38 at a frequency of 10 GHz, a glass transition temperature from about 160° C. to about 350° C. and a coefficient of thermal expansion (CTE) from about 100 ppm/K to about 140 ppm/K.

18. The kit according to claim 11, wherein the filler is an inorganic filler.

19. The kit according to claim 11, wherein the filler is an organic filler.

20. The kit according to claim 11, which is selected from the group consisting of:
   5-decylbicyclo[2.2.1]hept-2-ene (DecNB), 5-hexylbicyclo[2.2.1]hept-2-ene (HexNB), 1,4,4a,5,8,8a-hexahydro-1,4:5,8-dimethanonaphthalene (TDD), palladium (II) bis(tricyclohexylphosphine) diacetate (Pd785) and dimethylanilinium tetrakis(pentafluorophenyl)borate (DANFABA);
   5-decylbicyclo[2.2.1]hept-2-ene (DecNB), 5-phenylbicyclo[2.2.1]hept-2-ene (PhNB), 1,4,4a,5,8,8a-hexahydro-1,4:5,8-dimethanonaphthalene (TDD), palladium (II) bis(tricyclohexylphosphine) diacetate (Pd785) and dimethylanilinium tetrakis(pentafluorophenyl)borate (DANFABA);
   5-decylbicyclo[2.2.1]hept-2-ene (DecNB), 2,2'-bi(bicyclo[2.2.1]heptan-5-ene) (NBANB), 1,3-bis(2-(bicyclo[2.2.1]hept-5-en-2-yl)ethyl)-1,1,3,3-tetramethyldisiloxane (NBC2DMSC2NB), palladium (II) bis(tricyclohexylphosphine) diacetate (Pd785) and dimethylanilinium tetrakis(pentafluorophenyl)borate (DANFABA);

5-hexylbicyclo[2.2.1]hept-2-ene (HexNB), 2,2'-bi(bicyclo[2.2.1]heptan-5-ene) (NBANB), 1,3-bis(2-(bicyclo[2.2.1]hept-5-en-2-yl)ethyl)-1,1,3,3-tetramethyldisiloxane (NBC2DMSC2NB), palladium (II) bis(tricyclohexylphosphine) diacetate (Pd785) and dimethylanilinium tetrakis(pentafluorophenyl)borate (DANFABA);

3a,4,7,7a-tetrahydro-1H-4,7-methanoindene (DCPD), 5-hexylbicyclo[2.2.1]hept-2-ene (HexNB), palladium (II) bis(tricyclohexylphosphine) diacetate (Pd785) and dimethylanilinium tetrakis(pentafluorophenyl)borate (DANFABA); and 3a,4,7,7a-tetrahydro-1H-4,7-methanoindene (DCPD), 5-phenethylbicyclo[2.2.1]hept-2-ene (PENB), palladium (II) bis(tricyclohexylphosphine) diacetate (Pd785) and dimethylanilinium tetrakis(pentafluorophenyl)borate (DANFABA);

5-cyclohexylbicyclo[2.2.1]hept-2-ene (CyHexNB), 5-butylbicyclo[2.2.1]hept-2-ene (BuNB), palladium (II) bis(tricyclohexylphosphine) diacetate (Pd785) and dimethylanilinium tetrakis(pentafluorophenyl)borate (DANFABA);

5-cyclohexylbicyclo[2.2.1]hept-2-ene (CyHexNB), 5-butylbicyclo[2.2.1]hept-2-ene (BuNB), bicyclo[2.2.1]hepta-2,5-diene (NBD), palladium (II) bis(tricyclohexylphosphine) diacetate (Pd785) and dimethylanilinium tetrakis(pentafluorophenyl)borate (DANFABA);

1,2,3,4,4a,5,8,8a-octahydro-1,4:5,8-dimethanonaphthalene (TD), 5-butylbicyclo[2.2.1]hept-2-ene (BuNB), palladium (II) bis(tricyclohexylphosphine) diacetate (Pd785) and dimethylanilinium tetrakis(pentafluorophenyl)borate (DANFABA);

5-(cyclohex-3-en-1-yl)bicyclo[2.2.1]hept-2-ene (CyclohexeneNB), 5-butylbicyclo[2.2.1]hept-2-ene (BuNB), palladium (II) bis(tricyclohexylphosphine) diacetate (Pd785) and dimethylanilinium tetrakis(pentafluorophenyl)borate (DANFABA);

1,2,3,4,4a,5,8,8a-octahydro-1,4:5,8-dimethanonaphthalene (TD), 5-butylbicyclo[2.2.1]hept-2-ene (BuNB), bicyclo[2.2.1]hepta-2,5-diene (NBD), palladium (II) bis(tricyclohexylphosphine) diacetate (Pd785) and dimethylanilinium tetrakis(pentafluorophenyl)borate (DANFABA); and 5-cyclohexylbicyclo[2.2.1]hept-2-ene (CyhexNB), 5-butylbicyclo[2.2.1]hept-2-ene (BuNB), 3a,4,4a,5,8,8a,9,9a-octahydro-1H-4,9:5,8-dimethanocyclopenta[b]naphthalene (CPD3), palladium (II) bis(tricyclohexylphosphine) diacetate (Pd785) and dimethylanilinium tetrakis(pentafluorophenyl)borate (DANFABA).

* * * * *